US012640547B2

(12) United States Patent
     Kuhl

(10) Patent No.:    US 12,640,547 B2
(45) Date of Patent:        May 26, 2026

(54) ROOF CLIP

(71) Applicant: Steven S. Kuhl, Hopkins, MN (US)

(72) Inventor: Steven S. Kuhl, Hopkins, MN (US)

( * ) Notice: Subject to any disclaimer, the term of this patent is extended or adjusted under 35 U.S.C. 154(b) by 0 days.

(21) Appl. No.: 18/302,433

(22) Filed: Apr. 18, 2023

(65) Prior Publication Data

US 2023/0335980 A1      Oct. 19, 2023

Related U.S. Application Data

(60) Provisional application No. 63/332,459, filed on Apr. 19, 2022.

(51) Int. Cl.
     *H02G 3/30*          (2006.01)
     *F16L 3/137*         (2006.01)
     *F21V 21/088*        (2006.01)
     *H02G 3/04*          (2006.01)
(52) U.S. Cl.
     CPC ............... *H02G 3/24* (2013.01); *F16L 3/137*
         (2013.01); *H02G 3/0456* (2013.01); *F21V*
                                    *21/088* (2013.01)
(58) Field of Classification Search
     CPC .. F21W 2121/004; F21V 21/088; H02G 3/32;
                                         H05B 2214/02
     See application file for complete search history.

(56) References Cited

U.S. PATENT DOCUMENTS 2,657,442 A  *  11/1953  Bedford, Jr. .............. F16L 3/13
                                                      248/74.2
3,074,676 A  *   1/1963  Watson ............... E04D 13/0762
                                                      248/301

3,149,808 A  *   9/1964  Weckesser .............. F16L 3/233
                                                      248/74.3
3,181,827 A  *   5/1965  Sassin ....................... F16L 3/24
                                                        24/339
3,300,168 A  *   1/1967  Gaudino ................... B60R 7/08
                                                        24/326
3,594,682 A       7/1971  Oleson
D222,430 S      10/1971  Millar
3,686,609 A       8/1972  Hansen
3,858,370 A       1/1975  Halstead
                   (Continued)

FOREIGN PATENT DOCUMENTS

DE      202014008285 U1  *  1/2015  ......... B60R 16/0215
EP          2654128 B1  *  4/2017  ........... H01R 4/4809

OTHER PUBLICATIONS

EP-2654128-B1 machine translation (Year: 2017).*

(Continued)

*Primary Examiner* — Michael W Hotchkiss
(74) *Attorney, Agent, or Firm* — Merchant & Gould P.C.

(57)                    ABSTRACT

A system for attaching a cable to the roof of a building is disclosed. The system includes a clip with a base portion and a cable attachment portion. The base portion is configured to attach to a shingle on a roof. The cable attachment portion includes a cable attachment loop. The cable attachment loop includes a plurality of slits cut therein. A cable is able to be secured to the cable attachment loop with a tie. The cable can be oriented in various directions by routing the tie through either of the cable attachment loop or the plurality of slits. A method for using the cable attachment system is also disclosed.

8 Claims, 32 Drawing Sheets

(56)                    References Cited

U.S. PATENT DOCUMENTS

| | | | | |
|---|---|---|---|---|
| 4,005,510 | A * | 2/1977 | Noda | A41F 11/06 |
| | | | | 24/507 |
| 4,043,527 | A * | 8/1977 | Franzmeier | E04D 13/0762 |
| | | | | 248/65 |
| D261,775 | S | 11/1981 | Valigura | |
| 4,363,432 | A | 12/1982 | Warthen | |
| 4,683,622 | A | 8/1987 | Dehlke | |
| D303,159 | S | 8/1989 | Heath | |
| 4,993,959 | A * | 2/1991 | Randolph | H01R 4/64 |
| | | | | 439/865 |
| D317,252 | S | 6/1991 | Rumpel | |
| D340,183 | S | 10/1993 | Rumpel | |
| 5,326,055 | A * | 7/1994 | Page | H02G 3/30 |
| | | | | 248/65 |
| D350,216 | S | 8/1994 | Heaton | |
| 5,347,690 | A | 9/1994 | Mansoor | |
| D354,677 | S | 1/1995 | Troyer | |
| 5,496,005 | A * | 3/1996 | Dieringer | F21V 23/00 |
| | | | | 248/48.1 |
| D370,559 | S | 6/1996 | Arndt | |
| 5,566,058 | A * | 10/1996 | Protz, Jr. | F21V 21/088 |
| | | | | 362/396 |
| 5,581,956 | A * | 12/1996 | Fennessy | F21V 21/088 |
| | | | | 362/396 |
| 5,720,398 | A * | 2/1998 | Kump | A47F 5/0068 |
| | | | | 211/186 |
| D393,923 | S | 4/1998 | Dimonekas | |
| 5,740,994 | A * | 4/1998 | Laughlin | F16L 3/23 |
| | | | | 248/68.1 |
| 5,987,714 | A * | 11/1999 | Smith | F16B 5/065 |
| | | | | 24/295 |
| 6,106,310 | A * | 8/2000 | Davis | H01R 4/48 |
| | | | | 439/95 |
| 6,182,933 | B1 * | 2/2001 | Rapp | E04D 13/00 |
| | | | | 248/231.81 |
| D443,387 | S | 6/2001 | Torres et al. | |
| 6,332,594 | B2 * | 12/2001 | Shelton | F16L 3/02 |
| | | | | 248/65 |
| 6,378,814 | B1 * | 4/2002 | Kaplan | H02G 3/30 |
| | | | | 248/71 |
| 6,477,744 | B1 * | 11/2002 | Miles | B43K 23/002 |
| | | | | 24/3.12 |
| 6,572,062 | B1 * | 6/2003 | Limber | F21V 21/088 |
| | | | | 248/229.16 |
| 6,592,083 | B1 * | 7/2003 | Hobson | F16L 3/1233 |
| | | | | 248/74.1 |
| D513,171 | S | 12/2005 | Richardson | |
| D521,232 | S | 5/2006 | Andre | |
| D526,743 | S | 8/2006 | Battista, III et al. | |
| 7,287,354 | B2 * | 10/2007 | Rivers | E04F 19/00 |
| | | | | 52/220.1 |
| 7,309,150 | B2 * | 12/2007 | Vendrick | F21S 4/10 |
| | | | | 362/152 |
| 7,568,250 | B2 | 8/2009 | Menard-Flanagan | |
| D603,781 | S | 11/2009 | Jimenez | |
| D603,898 | S | 11/2009 | Rommel | |
| D653,940 | S * | 2/2012 | Yasher | D8/395 |

| | | | | |
|---|---|---|---|---|
| D670,159 | S | 11/2012 | Bitarchas et al. | |
| 8,616,512 | B2 * | 12/2013 | McMath | H02G 3/32 |
| | | | | 248/304 |
| 8,733,710 | B1 * | 5/2014 | Suazo | H02G 3/32 |
| | | | | 248/74.1 |
| 8,782,960 | B2 * | 7/2014 | Nark | E04D 13/103 |
| | | | | 52/13 |
| 8,888,337 | B2 * | 11/2014 | Adams, IV | F21S 4/10 |
| | | | | 362/396 |
| D736,612 | S | 8/2015 | Sickler, Jr. | |
| D738,713 | S | 9/2015 | Volin | |
| D756,764 | S * | 5/2016 | Limber | D8/395 |
| D769,707 | S | 10/2016 | Roentz | |
| 9,548,598 | B2 * | 1/2017 | Tally | H02G 3/32 |
| D781,571 | S | 3/2017 | Moerer | |
| D789,778 | S | 6/2017 | White | |
| 9,702,503 | B2 * | 7/2017 | Chi Man | B05B 15/62 |
| D806,529 | S | 1/2018 | Olenick | |
| D811,869 | S | 3/2018 | Gallion et al. | |
| D820,664 | S | 6/2018 | Allen et al. | |
| 10,187,004 | B2 * | 1/2019 | Rothschild | F24S 25/613 |
| D839,994 | S | 2/2019 | Cole et al. | |
| D847,623 | S | 5/2019 | Caron | |
| D861,471 | S | 10/2019 | Ild | |
| D876,942 | S | 3/2020 | Kuhl | |
| 10,663,149 | B2 * | 5/2020 | Wilson | F21V 21/0832 |
| 10,854,118 | B2 * | 12/2020 | DeBroux-Vincil | G09F 7/08 |
| 11,293,605 | B1 * | 4/2022 | Massinello | F21V 21/088 |
| 11,378,111 | B2 * | 7/2022 | Kuhl | F16B 7/22 |
| 2006/0150563 | A1 * | 7/2006 | Naheem | B60M 5/00 |
| | | | | 52/698 |
| 2012/0074268 | A1 * | 3/2012 | McMath | F16L 3/133 |
| | | | | 248/58 |
| 2012/0124782 | A1 * | 5/2012 | Elsner | B60R 16/0215 |
| | | | | 24/115 A |
| 2013/0270400 | A1 * | 10/2013 | Eyles | H02G 3/0437 |
| | | | | 248/72 |
| 2018/0019703 | A1 * | 1/2018 | Almy | H02S 30/10 |
| 2018/0058609 | A1 * | 3/2018 | Van Hulst | F16L 3/127 |
| 2018/0231221 | A1 * | 8/2018 | Wilson | F16B 2/005 |
| 2019/0190244 | A1 * | 6/2019 | Troughton | H01B 7/0045 |
| 2020/0041044 | A1 * | 2/2020 | Naugler | F16B 5/0685 |
| 2021/0238857 | A1 * | 8/2021 | Kuhl | H05B 1/023 |
| 2022/0140782 | A1 * | 5/2022 | Fischer | H02S 20/25 |
| | | | | 136/244 |

OTHER PUBLICATIONS

DE-202014008285-U1 translation (Year: 2015).*
Pirit, Roof Clips—Spring, Oct. 30, 2020, https://www.pirithose.com/wrap-on/roof-clip/14514.html (Year: 2020).*
King Electric; www.king-electric.com; SRK 13 Roof Clips Installation, Operation and Maintenance Instructions; accessed on Mar. 3, 2020; 2 pages.
Rexel USA, A Rexel Group Company, Erico Caddy 812MB18 Combination Box/Conduit Hanger, Drop Wire/Rod/Beam, 1/2" or 3/4", www.rexelusa.com/ ... eam/Erico-Caddy-812MB18-Combination-Box-Conduit-Hanger%2C-Drop-Wire-Rod-Beam%2C-1-2%22-or-3-4%22/p/113318?prevPageNumber=2, site visited May 11, 2019.

* cited by examiner

106

106

106

322

324

334

Attach Clip to Shingle

336

Attach Cable

106

204

302

252

248

260

260

256

102

106

302

246

204

328

500

502

Obtain Sheet of Material

504

Cut Vertical Slits

506

Cut Horizontal Slits

508

Cut Diagonal Slits

510

Fold Material

502

552

ROOF CLIP

CROSS-REFERENCE TO RELATED APPLICATION(S)

This application claims priority to and the benefit of U.S. Provisional Patent Application No. 63/332,459, filed on Apr. 19, 2022, the disclosure of which is hereby incorporated by reference in its entirety.

BACKGROUND

Various types of cable systems are used or a variety of different purposes. For example, cable systems are used to transmit electrical signals, transmit heat, or illuminate a space. In some examples, these types of cable systems are attached to the outside of building structures, such as on the roof of a building. This type of cable configuration may be used for hanging decorative lighting, routing satellite cables, routing extension cords, or installing a heating cable system.

Heating cable systems have been used to prevent ice dams from forming along roof edges and gutters of buildings located in areas with freezing temperatures. Usually, in these systems, heating cables are routed along the edge of the roof in a way that they form a zig-zag triangular pattern to provide channels where water can flow. Likewise, the heating cables may be routed along the interior of a roof gutter as to provide a flow channel and keep water from freezing within the gutter. In this way, water on the roof can flow down a path so that it is able to be removed from the roof without freezing.

Securing heating cables, and other types of cable to the roof of a building presents several challenges. First due to the roof's high exposure to sunlight and position on the exterior of the building, the roof is often subjected to extremely high and low temperatures for extended periods of time and may be exposed to dry, wet, windy, and snowy conditions. Likewise, depending on its location, the roof may endure significant ultraviolet radiation, which also tends to have damaging effects on a variety of materials. Lastly, materials used to build roofs are wide ranging and include, for example, asphalt shingles, cedar shakes, and synthetic shakes. Further complicating the process of securing the cable to the roof is the fact that is often undesirable to nail through the roof material, as this may damage the barrier sealing the interior of the building from the outside elements by creating pathways for moisture to travel from the atmosphere through the roofing materials and into the structure. Thus, due to these environmental and structural concerns, improvements to the process of securing cables to a roof are desired.

SUMMARY

In general terms, this disclosure is directed to a roof clip. In some embodiments, and by non-limiting example, the roof clip is attachable to the roof of a building, such as by connecting it to an edge of a shingle. In some embodiments, the roof clip is provided with a tie that is used to secure a cable to the roof clip. The tie can be fastened to a cable attachment portion of the clip and to the cable, which secures the cable to the roof clip. Once the tie is removed, the cable can be easily removed from the clip attachment portion of the roof clip. Subsequently, if desired, another tie can be used to attach the same or a different cable to the roof clip without the need to remove the clip from the roof. The roof clip is also removable from the shingle. The tie, in combination with the clip, allows a wide variety of cables to be secured to the roof at a variety of angles relative to the roof clip. In some embodiments the roof clip is an omni-directional clip. Various aspects are described in this disclosure, which include, but are not limited to, the following aspects.

In one aspect of the present disclosure relates to a cable attachment system for connecting a cable to a building. The cable attachment system comprises a clip. The clip comprises a shingle attachment portion that clamps onto a shingle. The shingle attachment portion includes a base and a retaining portion. The base includes at least one tooth. When the shingle attachment portion is installed onto the shingle, the base and the tooth engage an underside of the shingle and the retaining portion engages an opposite side of the shingle. The clip further comprises a cable attachment portion connected to and extending from the shingle attachment portion. The cable attachment further comprises at least one tie sized to fit within at least part of the cable attachment portion. When secured, the tie connects the cable to the cable attachment portion.

Another aspect is a clip for securing a cable to a roof. The clip comprises a shingle attachment portion configured to clamp onto a shingle and a cable attachment portion connected to and extending from the shingle attachment portion and configured to secure a cable thereto with a tie.

A further aspect is a clip that comprises a base having a plurality of teeth protruding from a top side. The clip further comprises a retaining portion that extends over the top side of the base. The clip further comprises a cable attachment portion protruding outwardly from the base. The cable attachment portion is configured to secure a cable thereto with a tie.

Another aspect is a method of securing a cable to a building. The method comprises attaching a roof clip to a shingle of the building. The roof clip includes a cable attachment portion. The method further comprises inserting a tie into the cable attachment portion and securing the tie around the cable to connect the cable to the roof clip.

DETAILED DESCRIPTION

Figure 1:
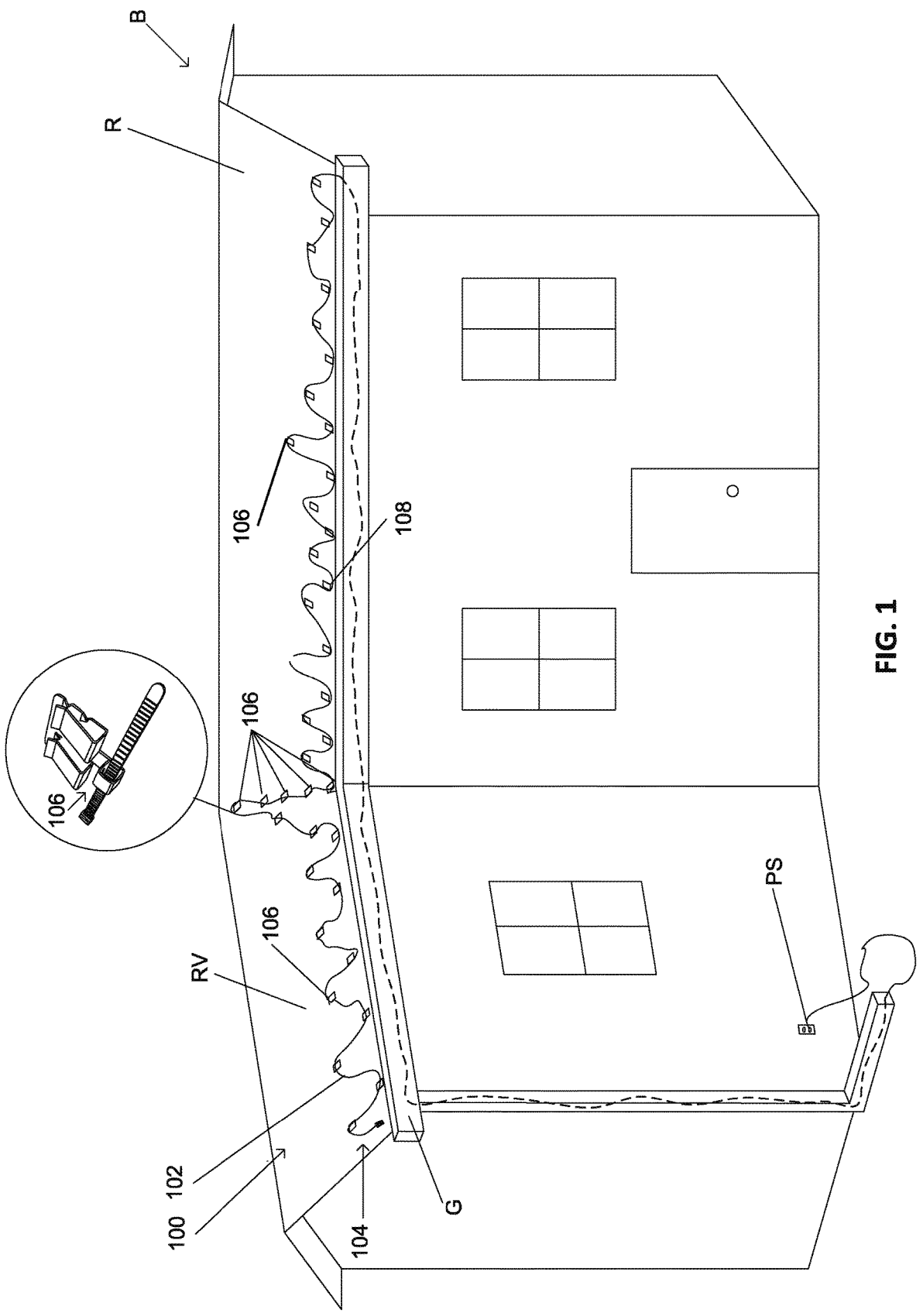
FIG. 1 is a perspective view of an example heating system mounted on a building.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Cables are often used to transmit electricity, signals, heat, and light from one location to another. In some applications, users may seek to route cables on and around the roof of a building. Examples of this include holiday lighting strings, satellite TV cables, extension cords connected to electrical devices on a roof, or heating cables used to melt frozen precipitation on a roof.

Snow and frozen precipitation have the potential to be problematic in regards to roof systems on heated buildings, which normally might function without issue in warmer temperatures. As snow and frozen precipitation accumulate on the roof of the building, the outer layers of frozen precipitation have the potential to insulate the inner layers of precipitation from the colder air temperatures. Meanwhile, heat from the building tends to radiate out from the roof and melt the inner insulated layers of precipitation. Thus, certain amounts of melted snow and precipitation may run down the slope of a roof towards the edge of the roof, or in some cases a gutter system, where there is less ambient heat from the building. Upon reaching unheated areas of the roof, such as the eaves and gutters, the melted precipitation tends to refreeze and form an accumulation of ice. This process is known to repeat, thus causing greater amounts of precipitation to accumulate and form a frozen mass of ice. This frozen mass will be referred to herein as an ice dam.

Ice dams can result in leaks through the roofing materials of the building, which may in turn result in damage to the ceiling, walls, insulation, or other parts of the building. Additionally, ice dams impede the functions of gutters that may be attached to the roof. Lastly, the ice dams can be dangerous, as pieces of ice have the potential to break off of the ice dam and fall on passersby below.

As alluded to above, one way to manage these ice dams is to use heating cables. In accordance with the present invention, various types of cables, including heating cables are mountable to a roof using clips to hold the cable in place. After attaching the clips to sections of the roof, the heating cable is able to be routed around the clips.

The present invention, including the cable/clip system described herein, is suitable to many different applications. For example, the cable may be a string of holiday lights, an internet cable or a telephone cable. In other examples, the cable is a general-purpose extension cord, or any other type of cable.

FIG. 1 is a perspective view of an example cable attachment system 100, mounted on a building B. In this example, the building B includes a roof R, and one or more power sources PS, and a gutters G. The example cable attachment system 100, further includes a cable 102, and a fastening system 104. The example fastening system 104, includes an omni-directional clip 106, and other clips 108.

In the example of FIG. 1, the cable attachment system 100, operates to provide power to a cable mounted on a roof R. In some examples, the cable 102 is a heating cable that prevents and reduces the buildup of ice dams.

In some embodiments the cable attachment system 100, includes a cable 102. In some examples, the cable 102 is a heating cable that heats to a temperature that is able to melt, or prevent freezing of, precipitation in contact with, or in close proximity to, the cable 102. In such examples, the cable 102, is generally able to withstand high and low environmental temperatures experienced by the roof R. In some examples, the cable 102, can be switched between an "on" state, in which a heating element within the cable 102, performs a heating function, and an "off" state, in which no heat is generated by the cable 102.

Although the cable 102, can be arranged in various configurations, in the example cable attachment system 100, shown on building B, in FIG. 1, the cable 102, is powered by plugging a power plug at one end of the cable 102, into the outlet of the power source PS, of the building B. The remaining length of the cable 102, is then configured to be routed up through the vertical downspout section of the gutter G towards the roof R of the building B. The cable 102, is further routed through the horizontal sections of the gutter G, at the top of the vertical downspout, and around other areas of the roof R. In some embodiments, such as when the cable 102 is a heating cable, the cable 102, is oriented to run in a zig-zag pattern along the edge section of the roof R, surface, so that upper peaks of the zig-zag are formed at a position on the roof R, above the lower valleys of the zig-zag. The valleys of the zig-zag are then placed in a position where they overlap with the edge of the roof so that the melted channels formed by the cable 102, direct liquid precipitation off of the surface of the roof R. Thus, in the case that the roof R, also includes a gutter G, the precipitation is able to flow into the gutter G, along its horizontal length, and down the downspout, while remaining heated, and in its liquid state, by the cable 102, routed therein.

Based on the materials and features of roof R, of the building B, different types of clips 106, 108, may be better suited for use with the cable attachment system 100. For example, roofs with asphalt shingles, cedar shakes, synthetic shakes, or natural or synthetic shakes may be more compatible with the omni-directional clip 106, described herein, whereas corrugated metal roofs may be more compatible with other clips 108, such as corrugated specific roof clips. Similarly, gutter section interiors may be more compatible with other clips 108, such as gutter separators or downspout clips.

Figure 2:
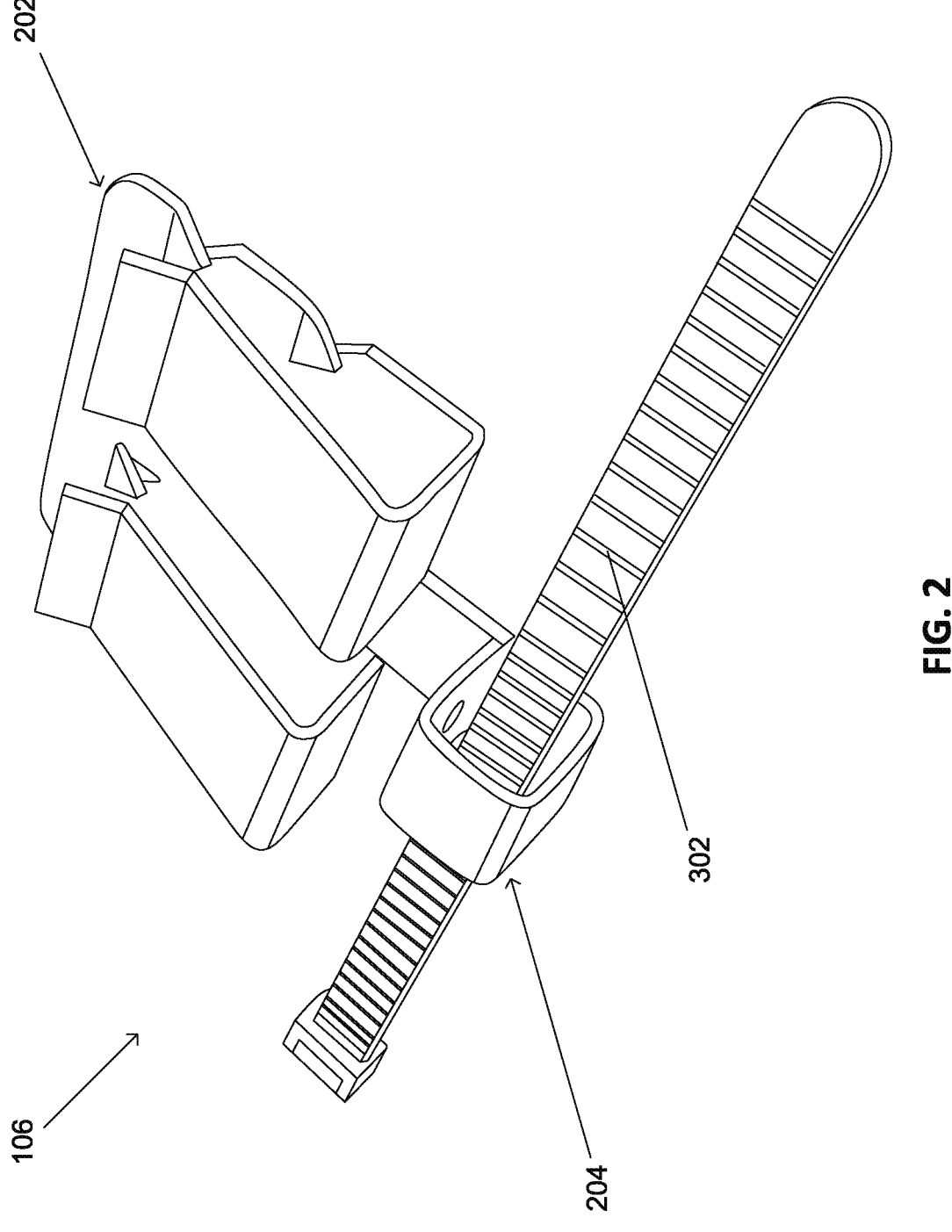
FIG. 2 is a perspective view of an example omni-directional clip of the example heating system of FIG. 1.

FIG. 2 is a perspective view of an example omni-directional clip 106, of the example fastening system 104, of FIG. 1. The example omni-directional clip 106, includes the base portion 202, and the cable attachment portion 204. The omni-directional clip 106, is shown with a tie 302, and is configured to secure a cable 102, to the roof R of a building B.

Figure 3:
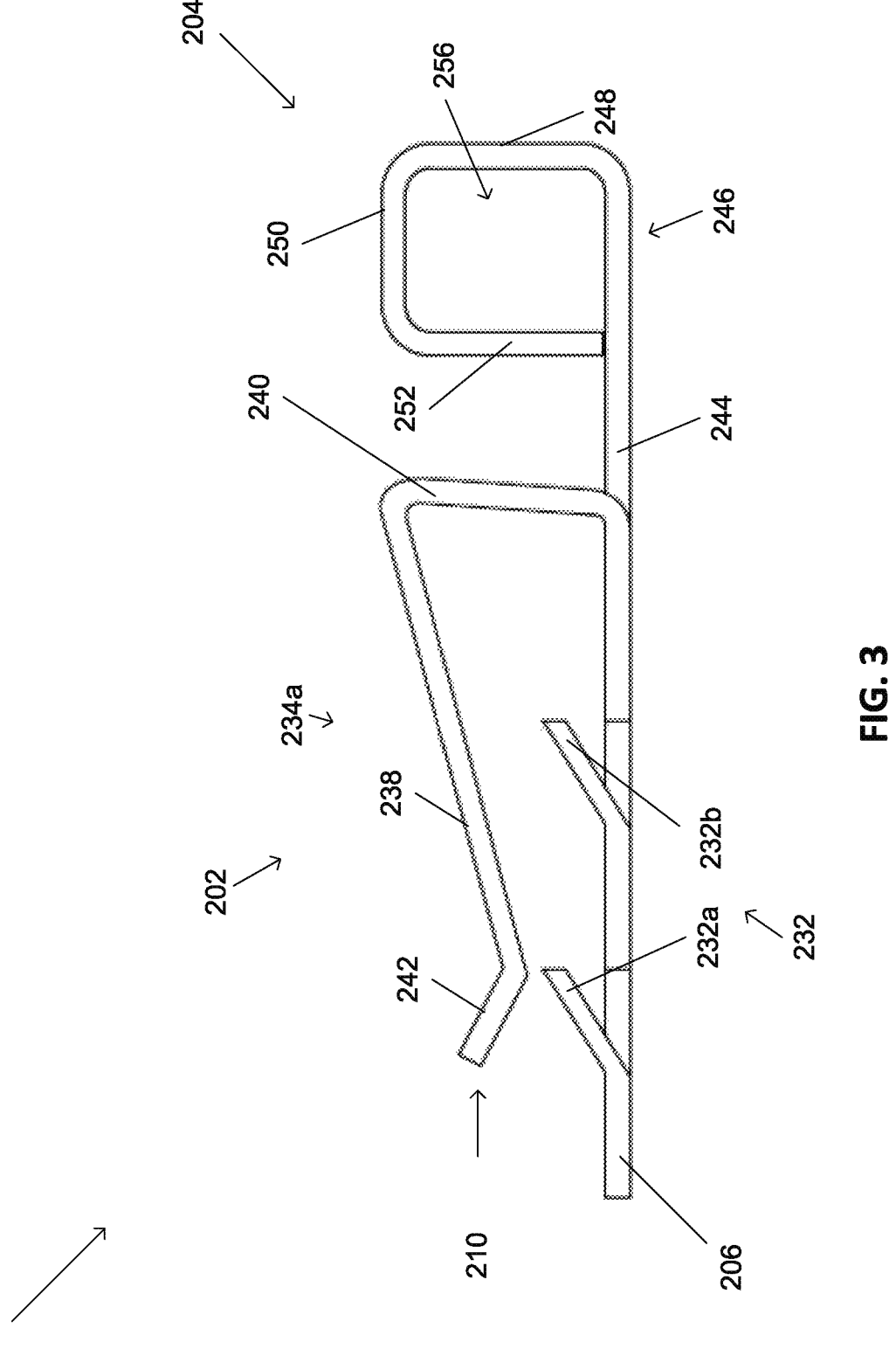
FIG. 3 is a right-side view of the example omni-directional clip of FIG. 2

FIG. 3 is a right-side view of the example omni-directional clip 106 of FIG. 2. In this example, the omni-directional clip 106, includes the base portion 202, and cable attachment portion 204. The base portion 202, further includes a base 206, a retaining portion 210, and at least one tooth 232 (including, for example, teeth 232a, 232b, 232c, and 232d, but only teeth 232c and 232d are visible in FIG. 3). In some embodiments the base 206 has a generally rectangular shape (shown more clearly in FIG. 5) and has a top and a bottom surface. The at least one tooth 232 protrudes from the base 206 and extends out from the top surface of the base 206 so that the pointed end terminates above the top surface of the base 206. In some embodiments the at least one tooth 232 is oriented so that the pointed end points in a upwardly and frontwardly direction.

Figure 4:
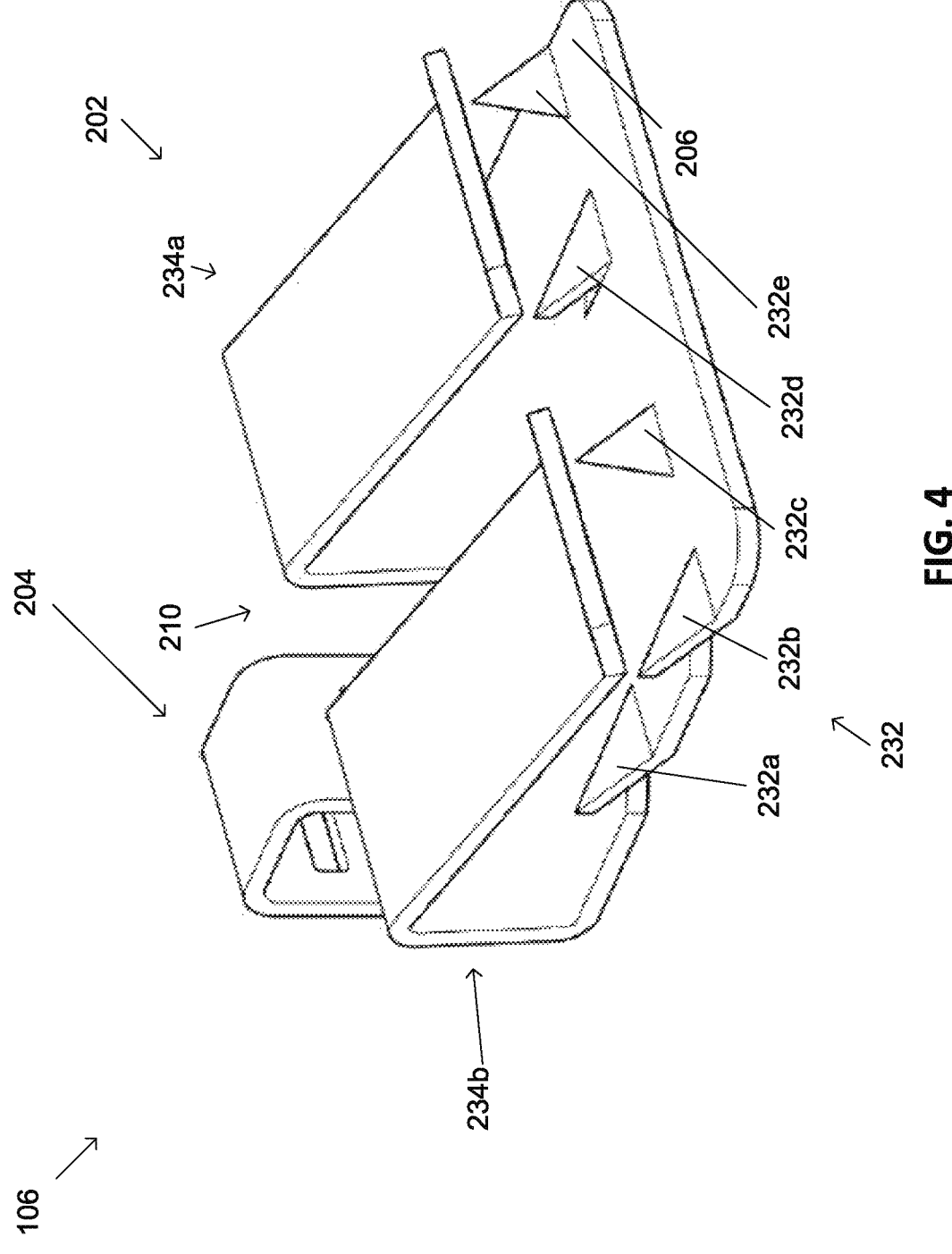
FIG. 4 is a rear perspective view of the example omni-directional clip of FIG. 2.

FIG. 4 is a rear perspective view of the example omni-directional clip 106 of FIG. 2. In some embodiments, such as the example of FIG. 4, the teeth 232 are located at the far left and right sides of the base 206. In this embodiment, teeth 232a, 232b, 232e may be formed from an angled cut into the left or right side of the base 206 in the rearwardly direction. On the other hand, teeth 232c, 232e are cut within the area of the base 206 by making two angled cuts. The teeth 232a, 232b, 232c, 232d 232e are bent to protrude out from the base 206.

In some embodiments, as in the embodiment of FIG. 4, the teeth 232 are located along a given side of the base 206 so that one tooth 232c is located at a distance rearward of another tooth 232d. Additionally, teeth 232 may be located on both the left and right sides, as well as the middle of, the base 206 so that, for example, one tooth 232c is located to the right or left of another tooth 232a, and vice versa.

Referring back to the example omni-directional clip 106 shown in FIG. 3, the retaining portion 210 is described. In this example, the retaining portion 210 is formed from two separate clip arms 234a, 234b (only clip arm 234a is visible in FIG. 3). However, in other examples, different numbers of clip arms 234 may be provided, such as, for example, one, three, four, or more clip arms 234. The front end of the base 206 connects to an upwardly extending portion 240 of the clip arm 234. The upwardly extending portion 240 contains a front and back side and in some embodiments has a generally rectangular shape. The upwardly extending portion 240 extends in an upward and slightly frontward direction in some embodiments. At its uppermost point, the upwardly extending portion 240 connects to a downwardly angled portion 238 of the clip arm 234a. The downwardly angled portion 238 has a generally rectangular shape and extends in a rearward and downward direction. In some examples, the clip arm 234a also includes an upwardly angled portion 242. The upwardly angled portion 242 is connected to the downwardly angled portion 238 at its lowest point. The upwardly angled portion 242 also has a generally rectangular shape and extends in a rearward and upward direction.

The clip arm 234 may also be configured so that the clip arm 234 does not extend past the rear end of the base 206. The clip arm 234 is further configured so that a space is defined between the clip arm 234 and the base 206 of the clip. In one embodiment, the teeth 232 are positioned below the clip arm 234 so that the teeth extend into the space between the clip arm 234 and the base 206.

Referring now to FIG. 4, as explained above, in some embodiments the base portion 202 includes two clip arms 234a, 234b. The clip arms 234a, 234b are positioned at the left and right sides of the base 206 and spaced apart from each other in the left/right direction. In this embodiment, the left side of the left clip arm 234a and the right side of the right clip arm 234b are positioned so that they are even with the respective left and right sides of the base 206 of the base portion 202, when viewed from a top view, such as the view of FIG. 5.

In some examples, the base portion 202, functions to secure the omni-directional clip 106 to components on a roof, such as, for example, a shingle. In this example, a shingle is placed into the space between the clip arms 234 and the base 206. Further explanation of the process of attaching the omni-directional clip to a shingle is described with reference to FIGS. 13-15.

Figure 5:
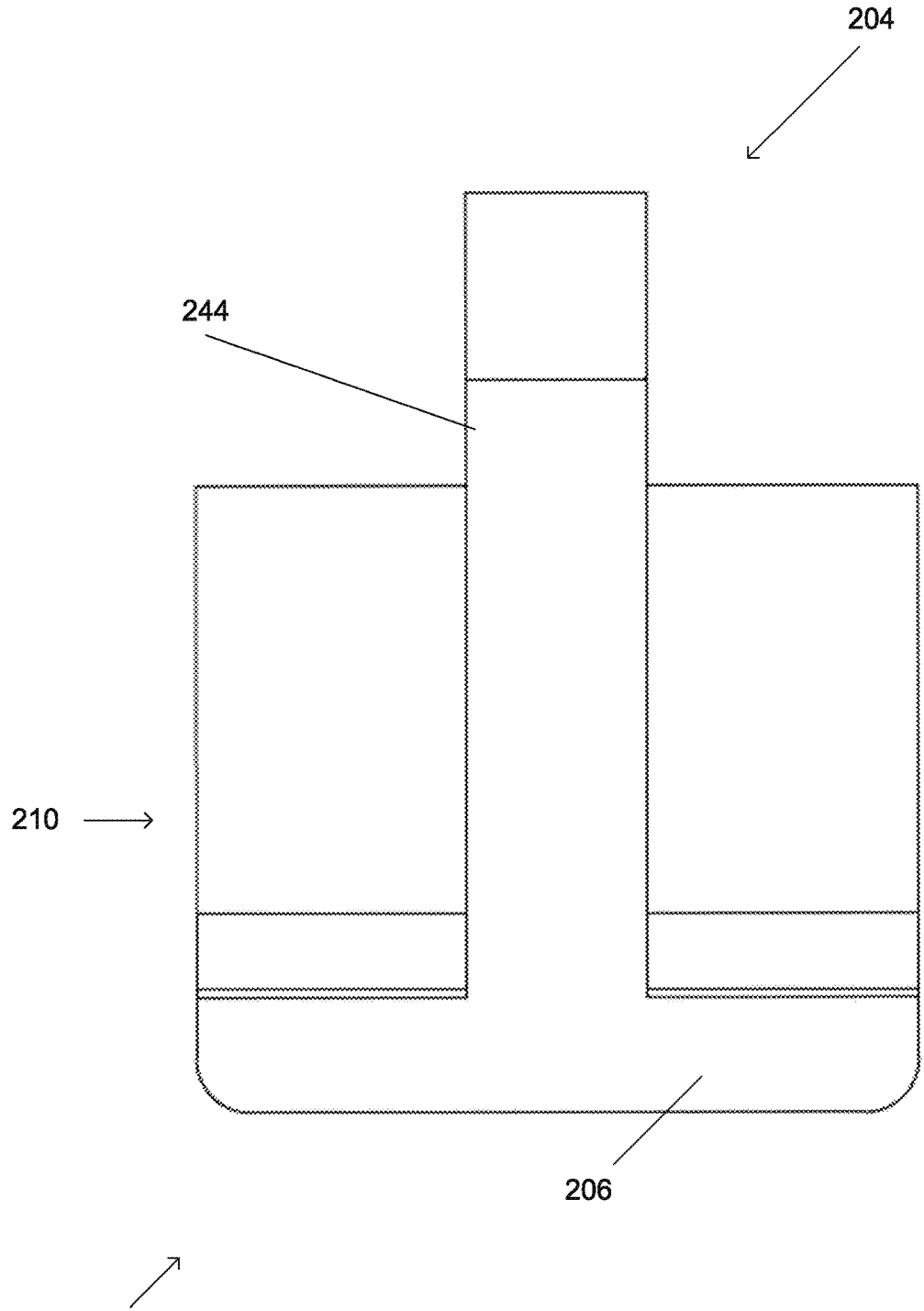
FIG. 5 is a top view of the example omni-directional clip of FIG. 2.

FIG. 5 is a top view of the example omni-directional clip of FIG. 2. In this example, the two clip arms 234a, 234b have an equal width in the left/right directions. A neck 244 connects to the front end of the base 206 and has a top and bottom surface. In some embodiments, the neck 244 is coplanar with the base 206. In some embodiments the neck 244 connects to the front end of the base 206 at the space between the two upwardly extending portions of the clip arms 134a, 134b. In some embodiments the width of the neck 244 is equal to the width of the space between the two upwardly extending portions 140a, 140b of the clip arms 134a, 134b. The neck 244 extends frontwardly in a horizontal direction away from the base 206. In some embodiments the neck 244 is coplanar with the base 206. Typically the frontwardly extending length of the neck 244 is substantially longer than the width of the neck 244 in the left/right direction.

Figure 6:
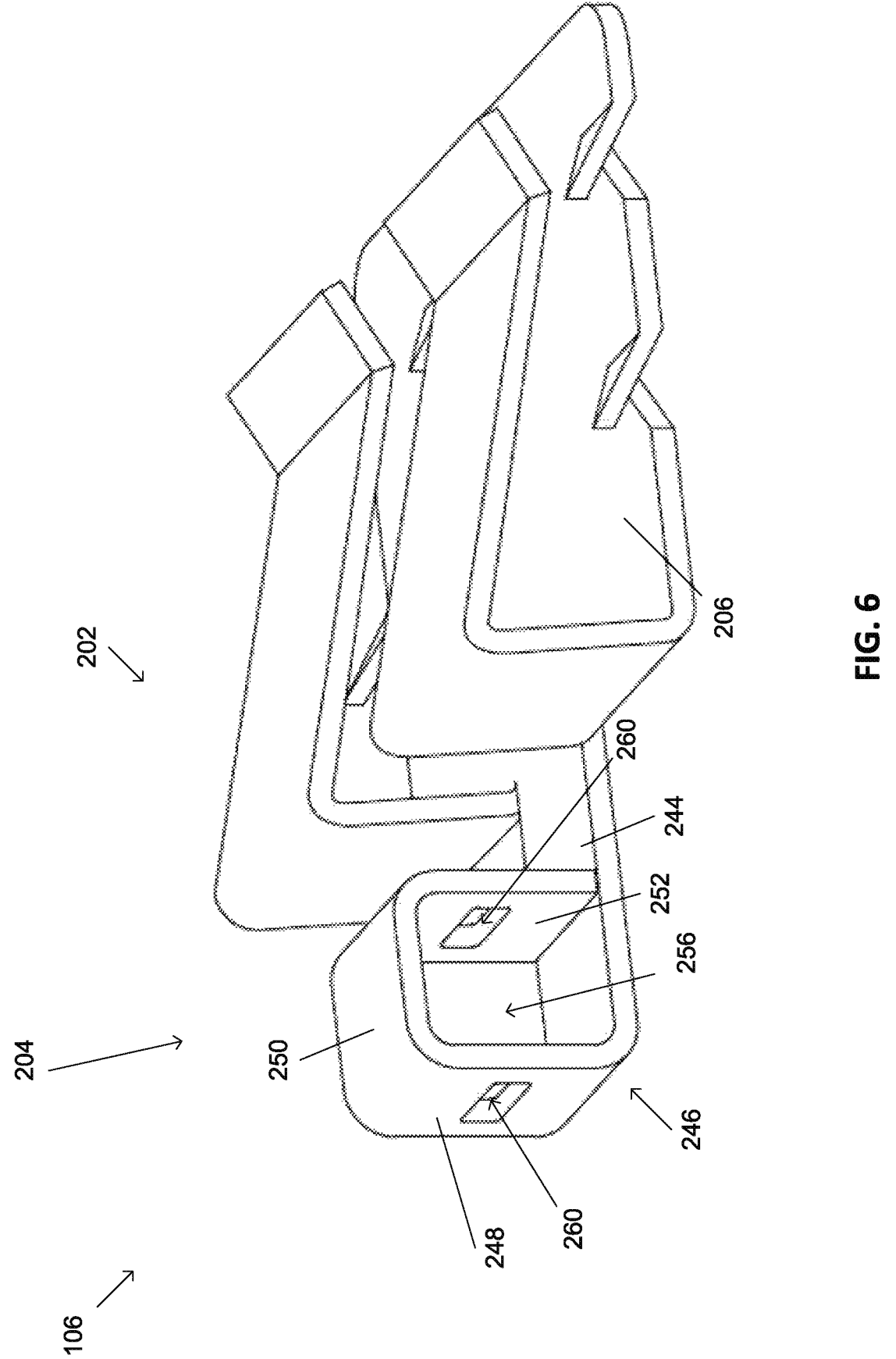
FIG. 6 is a front perspective view of the example omni-directional clip of FIG. 2.

FIG. 6 is a front perspective view of the example omni-directional clip 106 of FIG. 2. As seen in the example of FIG. 6, the cable attachment portion 204 includes a neck 244 and a cable attachment loop 246. The neck 244 extends from the base 206 in a frontward direction. At its frontwardlymost point, the neck 244 transitions to the cable attachment loop 246. In some examples, the cable attachment loop is formed from the neck 244 by bending the neck upwardly, rearwardly, and downwardly. Thus, the cable attachment loop is formed from an upwardly extending portion 248, rearwardly extending portion 250, and downwardly extending portion 252. In some examples, the end of the downwardly extending portion 252 contacts the top surface of the neck 244. The cable attachment loop includes a cable attachment space 256 defined by the neck 244, upwardly extending portion 248, rearwardly extending portion 250, and downwardly extending portion 252. In some examples, the height of the cable attachment loop 246 is the same height as the clip arms 234 at the uppermost point of the clip arms.

As seen in the example of FIG. 6, in some examples, a slit 260 is formed in each of the upwardly extending portion 248 and downwardly extending portion 252 of the cable attachment loop 246. In some examples, the slit 260 extends sideways from the left side to the right side of the upwardly extending portion 248 and downwardly extending portion 252.

Figure 7:
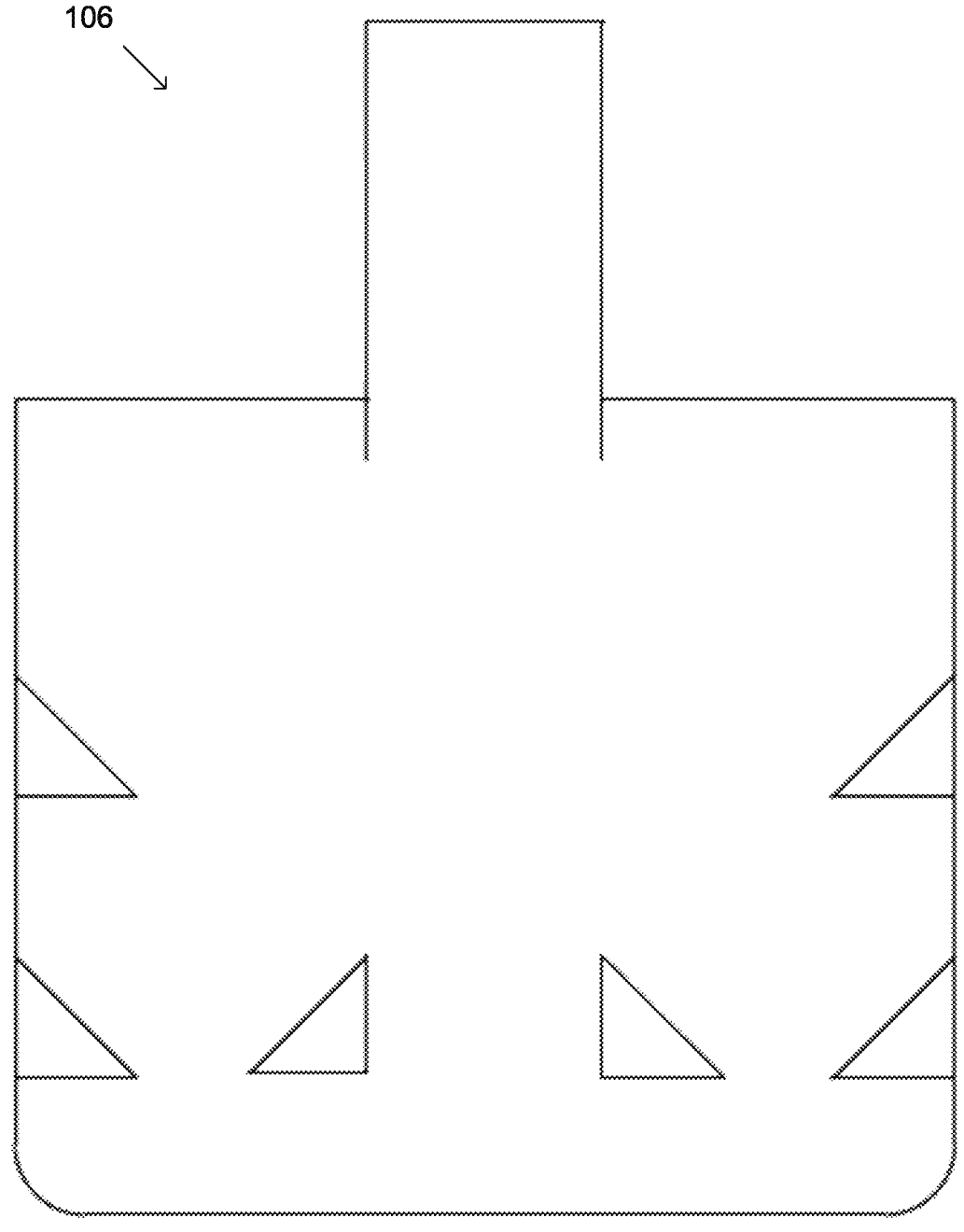
FIG. 7 is a bottom view of the example omni-directional clip of FIG. 2.
Figure 8:
FIG. 8 is a rear view of the example omni-directional clip of FIG. 2.
Figure 8:
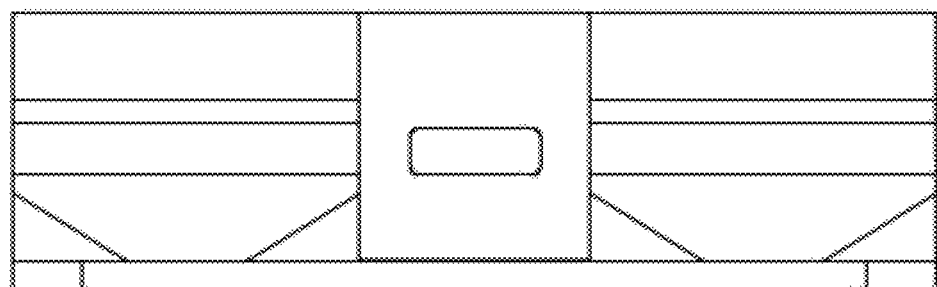
Figure 9:
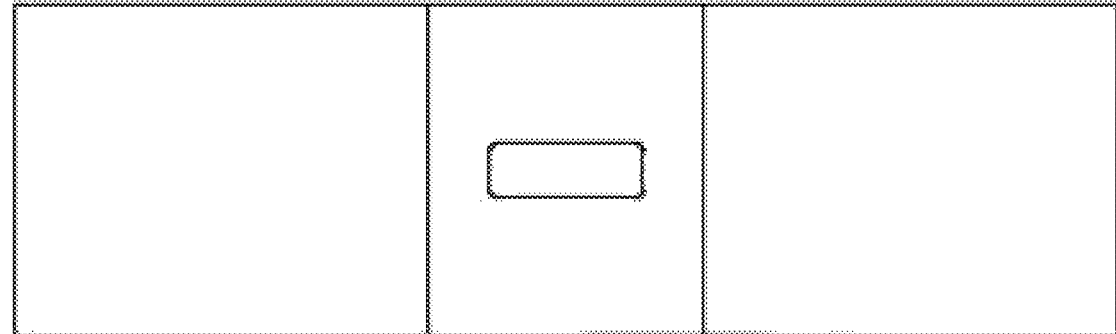
FIG. 9 is a front view of the example omni-directional clip of FIG. 2.
Figure 10:
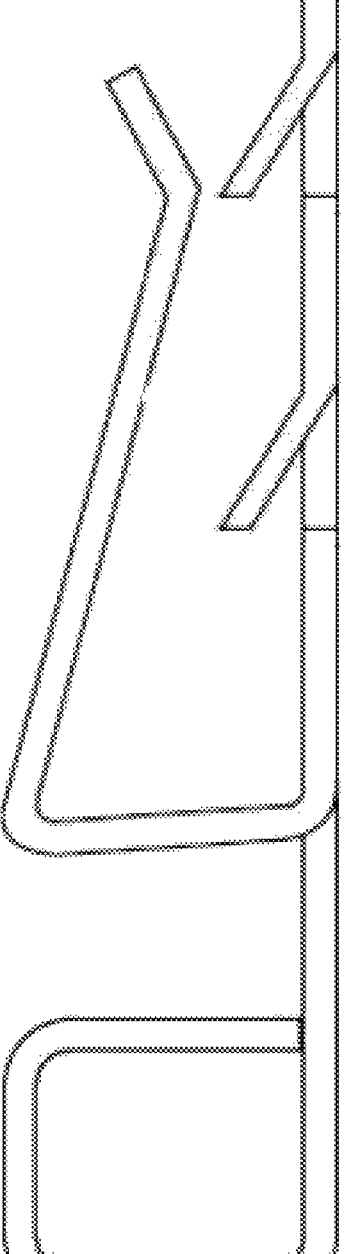
FIG. 10 is a left side view of the example omni-directional clip of FIG. 2.

FIGS. 7-10 depict alternative views of the example omni-directional clip 106 of FIG. 1. FIG. 7 is a bottom view of the example omni-directional clip 106. FIG. 8 is a rear view of the example omni-directional clip 106. FIG. 9 is a front view of the example omni-directional clip 106. FIG. 10 is a left side view of the example omni-directional clip 106.

Figure 11:
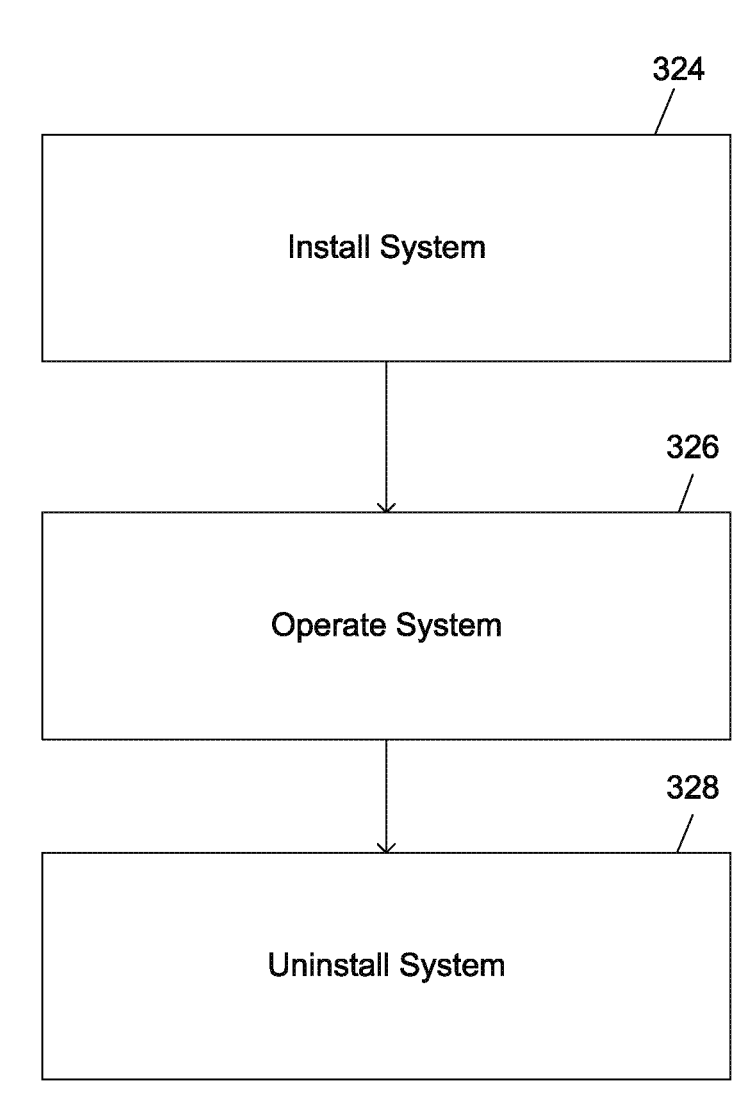
FIG. 11 is a flowchart of an example method of using the cable attachment system of FIG. 1.

FIG. 11 is a flowchart of an example method 322, of using the cable attachment system 100, of FIG. 1. The example method 322, includes operations 324, 326, and 328.

In one embodiment, the method 322, takes place over a span of several seasons. In some examples, the operation 324, is performed to install the cable attachment system 100, in the fall. The operation 326, is then performed to operate the cable attachment system 100, during the winter. Next, the operation 328, is performed to uninstall the cable attachment system 100, in the spring.

In other embodiments, the method 322, takes place over a span of several years. In this embodiment, after the operation 324, is performed to install the cable attachment system 100, the operation 326, is performed repeatedly to operate the cable attachment system 100 while the cable attachment system 100, is in place on a building. Finally, the operation 328, is performed to uninstall the cable attachment system 100, years later.

During the operation 324, the cable attachment system 100, is attached to the building so that the omni-directional clips 106, secure the cable 102, thereto. The operation 324, is described in further detail with reference to FIGS. 12-24.

During the operation 326, the cable attachment system 100, either remains inactive on the building or is operated to perform a function.

During the operation 328, the cable attachment system 100, is removed from the building. The operation 328, is described in further detail with reference to FIG. 25-26. In some embodiments, the operation 328 does not require complete removal of the cable attachment system 100 from the building. For example, in some embodiments, only the cable 102 is removed while the clips 106 are left attached to the building. In this embodiment, the cable 102 can then be reattached to the clips 106 later on.

Figure 12:
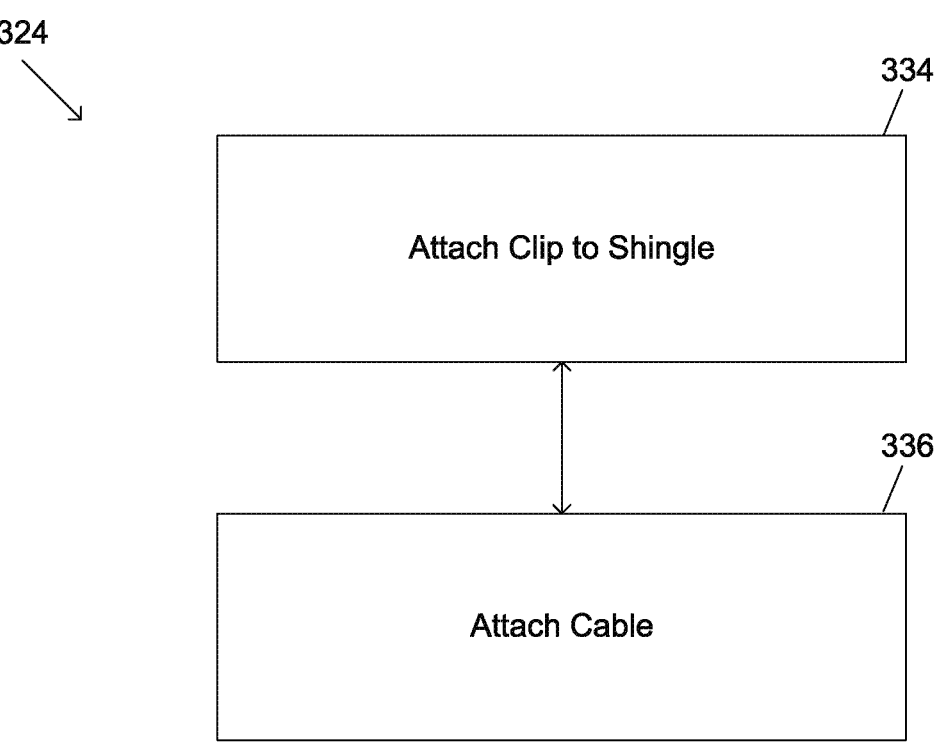
FIG. 12 is a flowchart of an example method of installing the cable attachment system of FIG. 1.

FIG. 12 is a flowchart of an example method 324, of installing the cable attachment system 100. The example method 324, includes operations 334, and 336.

The operation 334, consists of securing the omni-directional clip 106 to a shingle. The operation 334, as performed using the omni-directional clip 106, is described in further detail with reference to FIG. 13-15.

The operation 336, consists of attaching the cable 102, to the cable attachment portion 204, of the omni-directional clips 106. The operation 336, is described in further detail with reference to FIGS. 16-24.

In a first embodiment, the operation 334, is performed prior to the operation 336. In this embodiment, the omni-directional clips 106, are first attached to the building in areas where cable 102 is intended to be routed.

In another embodiment, the operation 336, is performed before the operation 334, so that the omni-directional clips 106, are attached to the building with the cable 102, already secured therein.

In a further embodiment, the operation 334, and operation 336, are repeated in series along the length of the cable 102. In this embodiment, the operation 334, and operation 336, are performed, in either order, with one or more omni-directional clips 106, at one location on the length of the cable 102. After completing both operations 334, 336, the method 324, is then repeated with the next one or more clips 106, 108, at a next location along the length of the cable 102.

Figure 13:
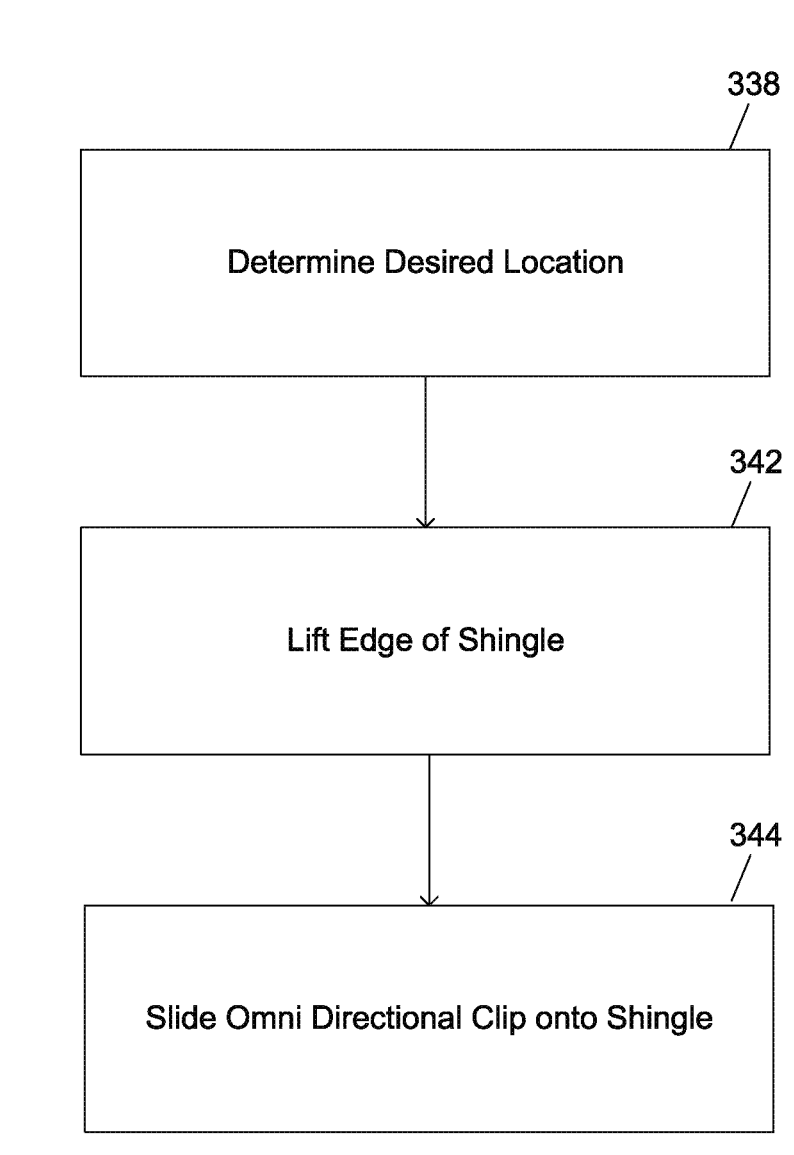
FIG. 13 is a flowchart of an example method 334 of attaching the omni-directional clip of FIG. 2 to a shingle.

FIG. 13 is a flowchart of an example method 334 of attaching the omni-directional clip 106 to a shingle.

The operation 338 includes examining a roof for a suitable location for the omni-directional clip 106. In some embodiments, the operation 338 includes finding a shingle to attach the omni-directional clip 106.

In some examples, shingles are attached to a roof with one end affixed to the roof and the other end being free and unsecured. Operation 342 includes lifting a free edge of the shingle. In operation 342, the free edge of the shingle is pried up so that the underside of the shingle is accessible. In some examples, the free edge of the shingle is lifted by hand. In other examples, the free edge of the shingle can be pried up with a tool or with the edge of the base 206 of the omni-directional clip 106.

Figure 14:
FIG. 14 is a left view of the example omni-directional clip of FIG. 2 being slid onto a shingle.

Operation 344 includes sliding the omni-directional clip onto the shingle S. Operation 344 is illustrated in FIG. 14. In the operation of 344, the free end of the shingle S is inserted into the space between the upwardly angled portion 242 of the clip arm 234b and the base 206 of the omni-directional clip 106. The upwardly angled portion 242 of the clip arm 234b functions to create a wider space between the clip arm 234b and the base 206 at the rear of the omni-directional clip 106 to facilitate easy insertion of the free edge of the shingle S. Once the shingle S is inserted into the space, the omni-directional clip 106 is pushed in the direction of the arrow A. As the free edge of the shingle S reaches the lowest point of the clip arm 234b, the clip arm exhibits a downward force on a top surface of the shingle S, which pushes the shingle against the base and the teeth. Due to angle of the teeth, the omni-directional clip 106 is still able to be pushed forward in the direction of the arrow A so that the shingle S moves over the pointed ends of the teeth until the free edge of the shingle S reaches a desired position within the space. After the free edge reaches the desired position, a user may optionally pull the omni-directional clip 106 back in the direction opposite the arrow A, as to cause the teeth 232 to engage with the bottom surface of the shingle S.

Figure 15:
FIG. 15 is a left view of the example omni-directional clip of FIG. 2 attached to a shingle.

FIG. 15 is a left side view of an example omni-directional clip 106 attached to a shingle S after the omni-directional clip 106 is slid onto the shingle in operation 344. As seen in FIG. 15, the base portion 202, is configured to attach the omni-directional clip to a roof shingle. In this example, the base 206 and the retaining portion 210 of the base portion 202 work together to secure the omni-directional clip 106 to the shingle. In some examples, the omni-directional clip 106 is able to be attached to a wide variety of roofing materials. For example, in some examples, the omni-directional clip 106 is attachable to wooden shingles, asphalt shingles, or composite shingles. In some examples, the omni-directional clip 106 is attachable to shingles with a thickness in a range from about ⅛ inches to about ⅜ inches (or from ⅛ inches to ⅜ inches) (0.049 cm to 1.181 cm) thick.

In some examples, when inserting the roofing material into the space, the clip arms 234 of the retaining portion 210 flex in an upwardly direction to accommodate the thickness of the shingle placed into the space between the clip arms 234 and the base 206. However, as the material is placed into the space, the clip arms 234 continue to exhibit a downwardly force on the roofing material and press the portion of the roofing material in the space against the base 206. The pressure applied by the retaining portion 210 provides friction which helps to secure the omni-directional clip 106 to the shingle S.

In some examples, the teeth 232 also help to secure the omni-directional clip to the shingle. As shown in FIG. 15, in some examples, when the portion of the shingle is placed in the space between the base 206 and the clip arms 234, the teeth 232 contact the bottom surface of the shingle S. In some examples, the pointed ends of the teeth 232 engage with a surface of the shingle S so that if the omni-directional clip 106 is pulled off the shingle S, the pointed ends of the teeth 232 sink into the shingle S and prevent the omni-directional clip 106 from being separated from the shingle S. In some examples, the force applied by the retaining portion 210 and the engagement provided by the teeth 232 against the shingle S work together to secure the omni-directional clip 106 to the shingle S and prevent it from inadvertently being removed from or falling off of the shingle S.

Figure 16:
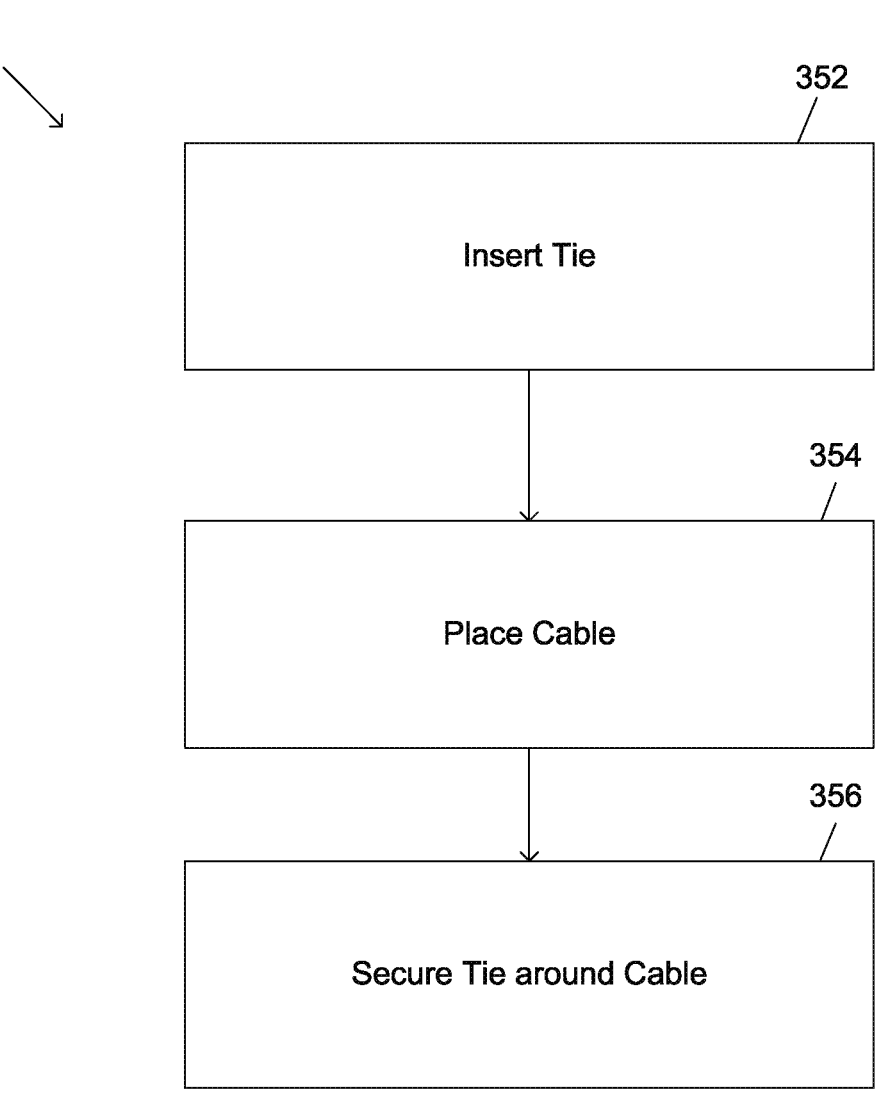
FIG. 16 is a flowchart depicting an example method of performing the cable attachment step of the method of FIG. 13.
Figure 17:
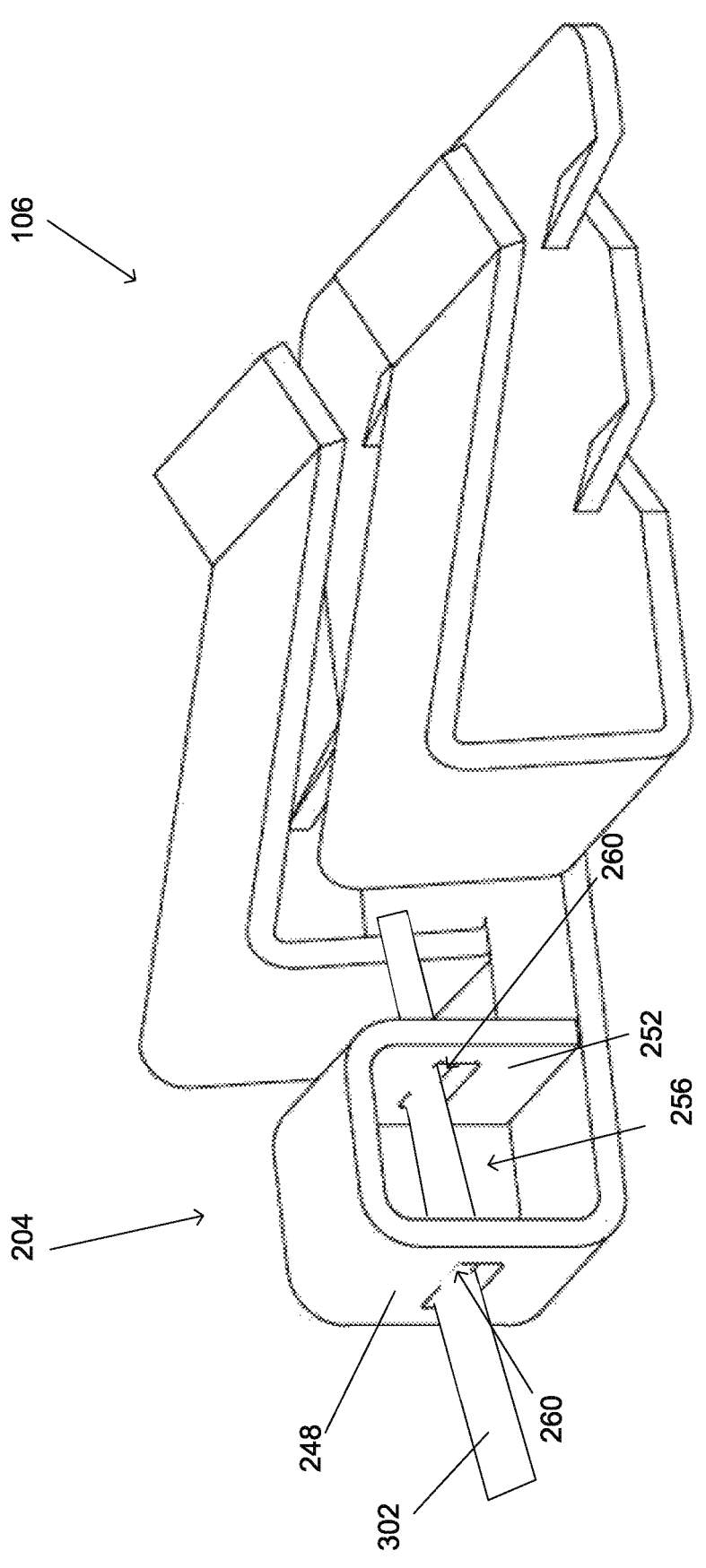
FIG. 17 is a rear perspective view of the example omni-directional clip of FIG. 3 with the tie inserted in the first orientation.
Figure 18:
FIG. 18 is a rear perspective view of the example omni-directional clip of FIG. 3 with the tie inserted in the second orientation.

FIG. 16 is a flowchart depicting an example method of performing the cable attachment step 336 of FIG. 13. The cable attachment step 336 includes operations 352, 354, and 356. In operation 352, a tie 302 is inserted into the cable attachment portion 204 of the omni-directional clip 106. Depending on the preferences of the user and the orientation of the omni-directional clip 106 or cable 102, the tie 302 can be inserted in at least two different orientations. As depicted in the example of FIG. 17, in the first orientation, the tie 302 is inserted through the slits 260 in the cable attachment portion 204 of the omni-directional clip 106. When inserted in this orientation, the tie 302 extends through the slit 260 in the upwardly extending portion 248 at the front of the omni-directional clip 106. The tie 302 extends through the cable attachment space 256 and towards the slit 260 in the downwardly extending portion 252 towards the rear end of the omni-directional clip 106. Alternatively, as depicted in the example of FIG. 18, in the second orientation, the tie 302 is inserted through the cable attachment space 256 from the left side of the omni-directional clip 106 and out the right side of the omni-directional clip 106, or vice versa.

Referring back to the flowchart of FIG. 16, in operation 354, the cable 102 is placed on or around the cable attachment portion 204 of the omni-directional clip 106. In some examples, the cable 102 is placed on top of the rearwardly extending portion 250 of the cable attachment portion 204, while in other examples, the cable 102 is placed adjacent to the cable attachment portion 204. The cable 102 can be placed in a variety of orientations. In some examples, the cable 102 is placed in a first orientation so that it extends from the front end of the omni-directional clip 106 to the rear end. In other examples, the cable 102 is placed in a second orientation so that it extends from the left side of the omni-directional clip 106 to the right side. In some examples, the cable 102 is placed in a hybrid first orientation so that it extends diagonally across the omni-directional clip 106 in substantially the front-rear direction. In some examples, the cable 102 is placed in a hybrid second orientation so that it extends diagonally across the omni-directional clip 106 in substantially the left-right direction.

In operation 356, the tie 302 is secured around the cable 102. In some examples, the tie 302 is wrapped around the cable 102 and tied in a knot. In other examples, the tie 302 includes fastening features that allow the tie 302 to be secured to itself without a knot. In some examples, the tie 302 includes adhesive that allows the tie 302 to stick to itself or the cable 102.

In some examples, the tie 302 is a traditional plastic zip-tie. However, in other examples, the tie 302 could be, for example, a length of rope or string, a twist tie, a rubber band, a Velcro strip, a bungee cord, a wire, a clip, or a length of tape. In some examples, the cross-sectional body of the tie 302 is sized appropriately so that it fits through the slits 260 and cable attachment space 256 of the cable attachment portion 204. In some examples, the tie 302 is long enough to wrap around the entire body of the cable 102.

Figure 19:
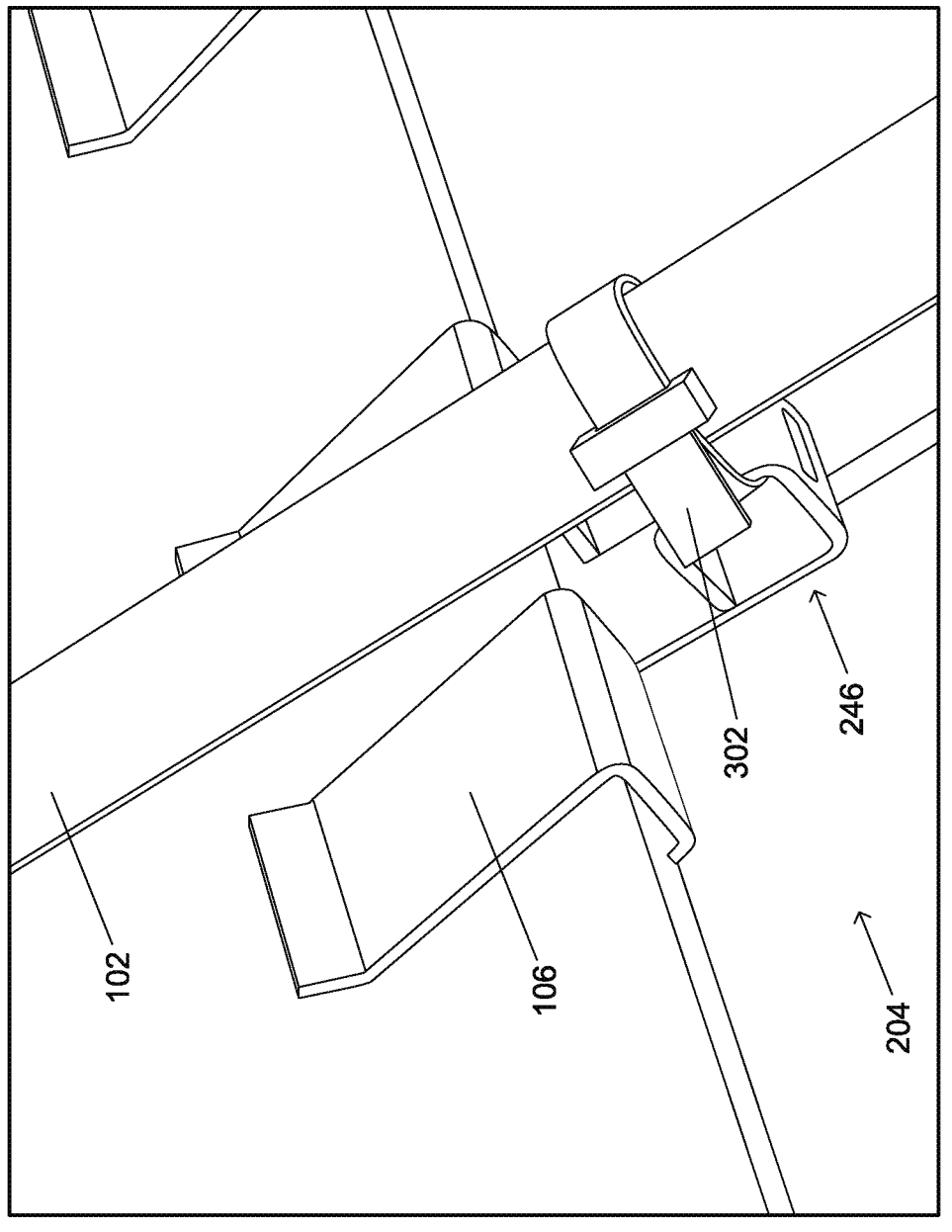
FIG. 19 is a perspective view of the example omni-directional clip of FIG. 3 secured to a shingle with a cable secured to the clip in a first orientation.

FIG. 19 is a perspective view of an omni-directional clip 106 secured to a shingle with a cable 102 secured to the omni-directional clip 106 in a first orientation, after the tie 302 is secured around the cable 102 in operation 356. In the example of FIG. 19, the cable is secured to the omni-directional clip so that it extends in a frontwardly-rearwardly direction along the length of the omni-directional clip. In this example, the cable is secured to the cable attachment portion 204. Specifically, the cable is secured to the cable attachment loop 246 of the cable attachment portion 204. In this example, the cable 102 is positioned on top of the cable attachment loop 246 and secured to the cable attachment loop 246 by the tie 302. The tie 302 is routed through the cable attachment space, as described with reference to FIG. 18, and wrapped around the circumference of the cable 102. In this configuration, the cable 102 is secured to the upper surface of the rearwardly extending portion 250 of the cable attachment loop 246 by the tie.

Figure 20:
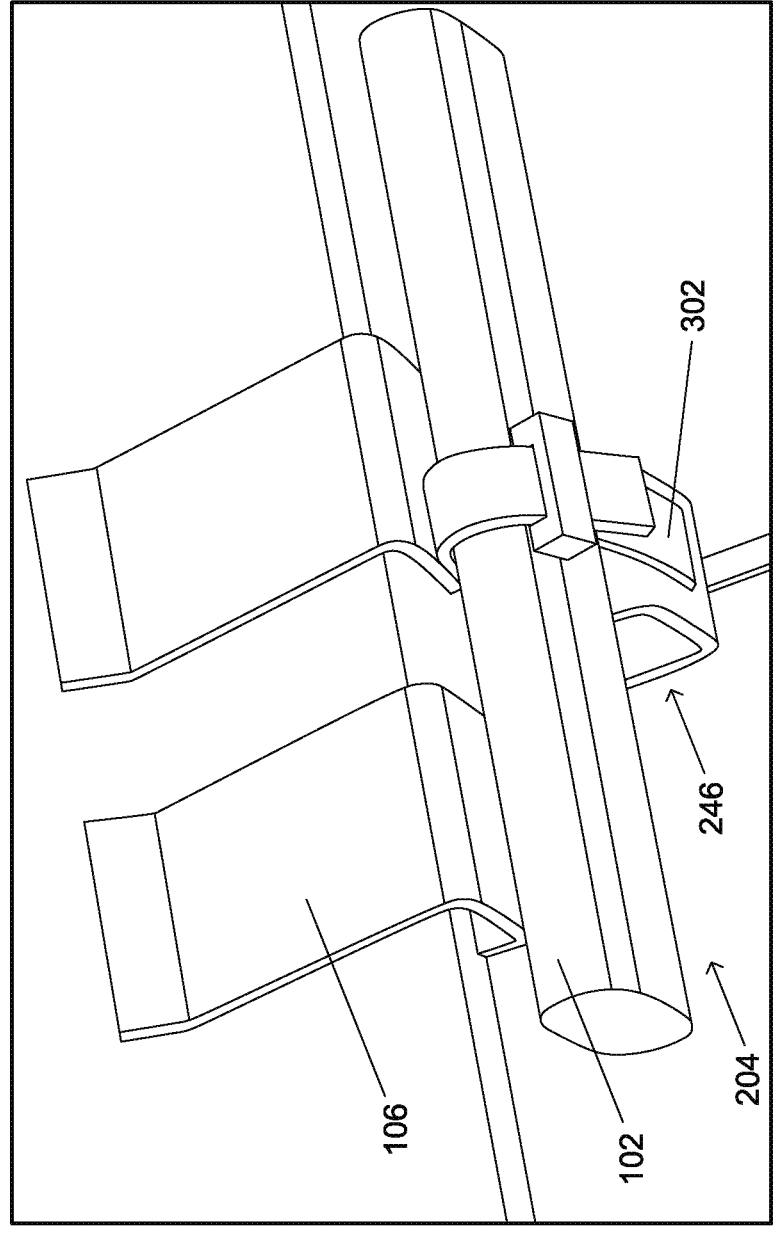
FIG. 20 is a perspective view of the example omni-directional clip of FIG. 3 secured to a shingle with a cable secured to the clip in a second orientation.

FIG. 20 is a perspective view of the omni-directional clip secured to a shingle with a cable connected in a second orientation, after the tie 302 is secured around the cable 102 in operation 356. In the example of FIG. 20, the cable 102 is secured to the omni-directional clip 106 so that it extends in a right to left direction along the length of the omni-directional clip 106. In the example of FIG. 20, the cable 102 is secured to the cable attachment portion 204. Specifically, the cable 102 is secured to the cable attachment loop 246 of the cable attachment portion 204. In the example of FIG. 20, the cable 102 is positioned on top of the cable attachment loop 246 and secured to the cable attachment loop 246 by a tie 302. In the example of FIG. 20, the tie 302 is routed through the slits in the upwardly extending portion and downwardly extending portion of the cable attachment loop 246, as described with reference to FIG. 17, and wrapped around the circumference of the cable 102. In this configuration, the cable 102 is secured to the upper surface of the rearwardly extending portion of the cable attachment loop 246 by the tie.

Figure 21:
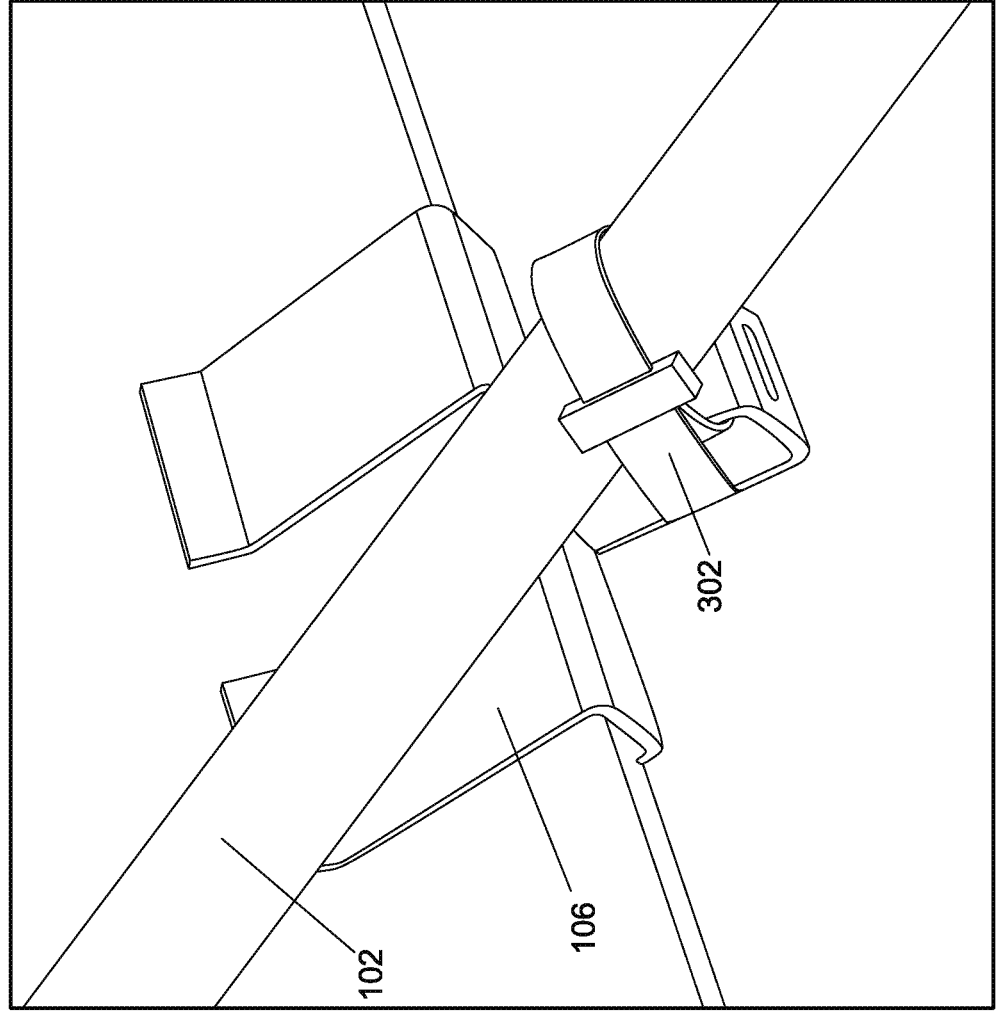
FIG. 21 is a perspective view of the example omni-directional clip of FIG. 3 secured to a shingle with a cable secured to the clip in a hybrid first orientation.
Figure 22:
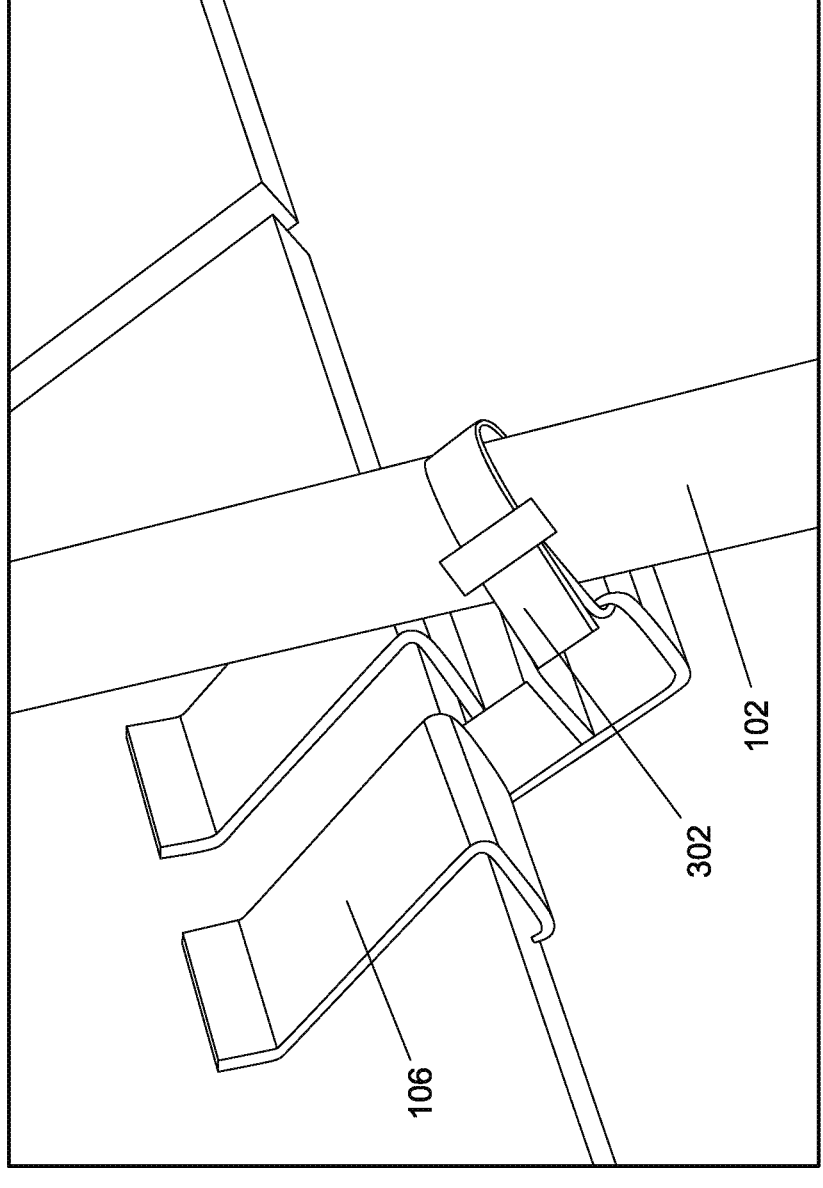
FIG. 22 is a perspective view of the example omni-directional clip of FIG. 3 secured to a shingle with a cable secured to the clip in another hybrid first orientation.

FIGS. 21-22 are perspective views of the omni-directional clip 106 secured to a shingle with a cable connected in hybrid first-orientations, after the tie 302 is secured around the cable 102 in operation 356. In the examples of FIGS. 21-22, the cable 102 extends diagonally across the omni-directional clip 106, while the tie 302 is routed through the cable attachment space, as described with reference to FIG. 18. In these examples, the tie 302 is secured to the cable 102 loose enough to permit the cable 102 to be routed diagonally through the tie 302. Securing the cable 102 to the cable attachment portion 204 in this manner provides greater flexibility when installing the omni-directional clips 106 and the cable 102 on a roof.

Figure 23:
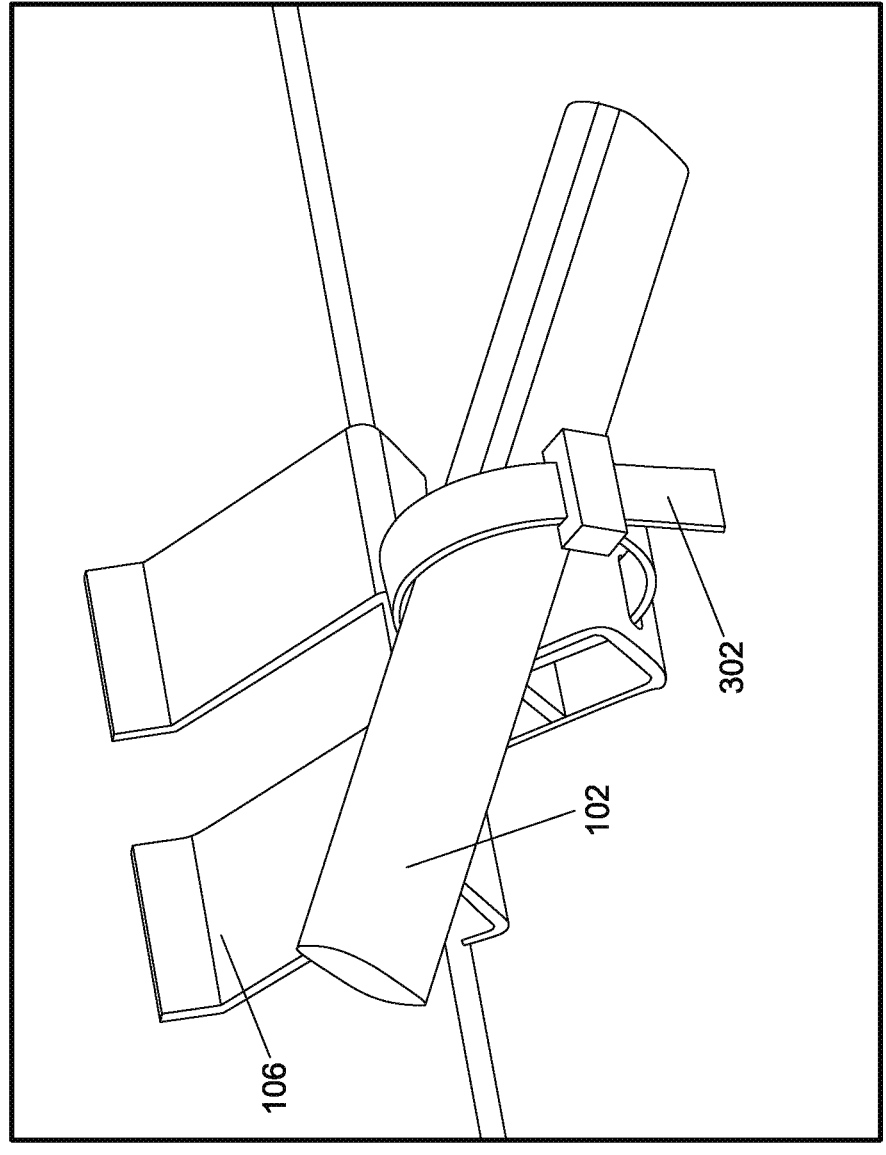
FIG. 23 is a perspective view of the example omni-directional clip of FIG. 3 secured to a shingle with a cable secured to the clip in a hybrid second orientation.
Figure 24:
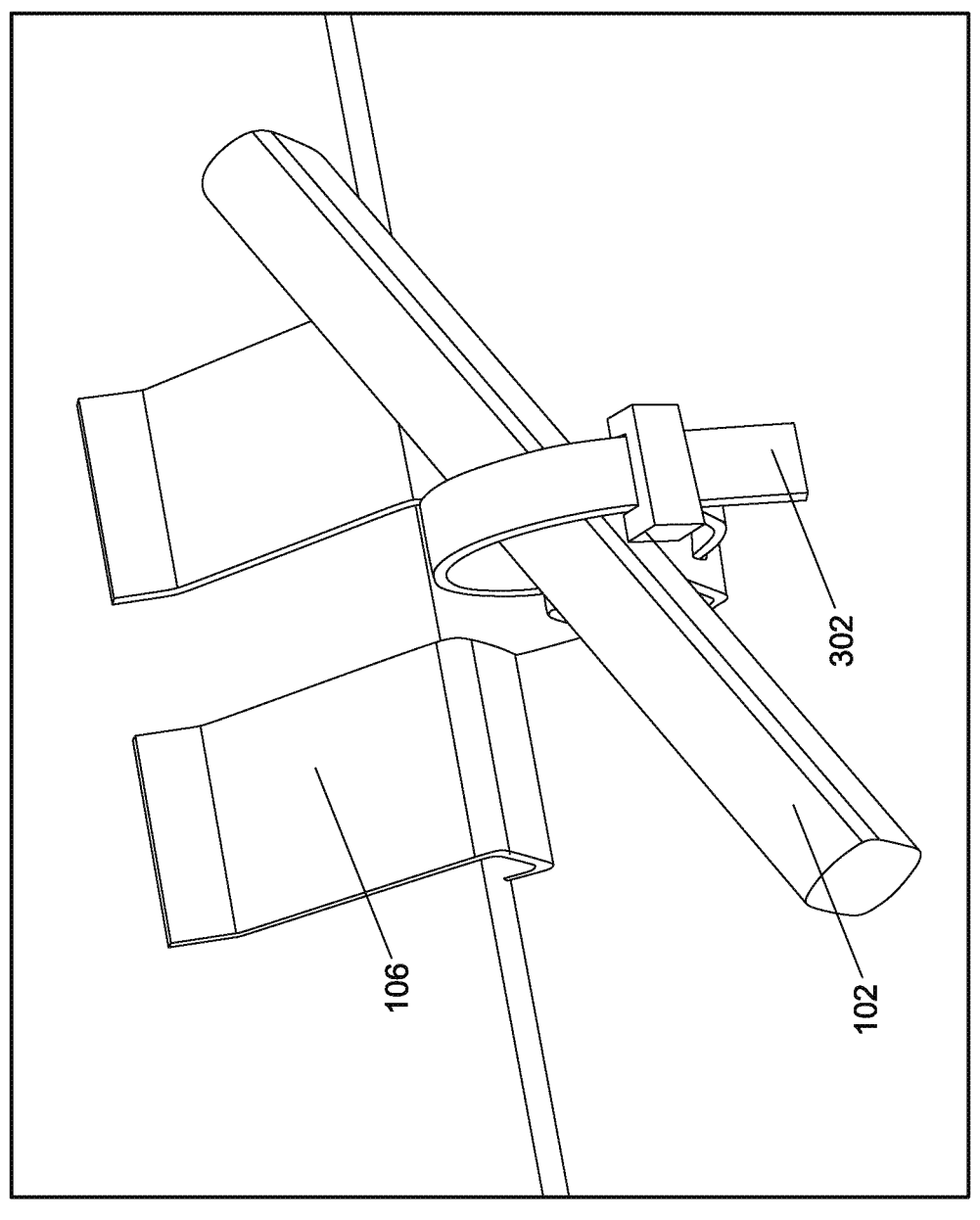
FIG. 24 is a perspective view of the example omni-directional clip of FIG. 3 secured to a shingle with a cable secured to the clip in another hybrid second orientation.

FIGS. 23-24 are perspective views of the omni-directional clip secured to a roofing material with a cable connected in hybrid second-orientations, after the tie 302 is secured around the cable 102 in operation 356. In the examples of FIGS. 23-24, the cable 102 extends diagonally across the omni-directional clip 106, while the tie 302 is routed through the slits in the upwardly extending portion and downwardly extending portion of the cable attachment portion 204, as described with reference to FIG. 17. In these examples, the tie 302 is secured to the cable 102 loose enough to permit the cable 102 to be routed diagonally through the tie 302. Securing the cable 102 to the cable attachment portion 204 in this manner provides greater flexibility when installing the omni-directional clips 106 and the cable 102 on a roof.

Thus, as shown and described with reference to FIGS. 18-24, the cable attachment portion and the tie together permit the cable to be secured to the clip in a variety of orientations. In some embodiments they permit the cable to be secured at any orientation in a 360 degree range of orientations relative to the roof clip, including a first orientation, a second orientation, and any of a plurality of hybrid orientations therebetween.

Figure 25:
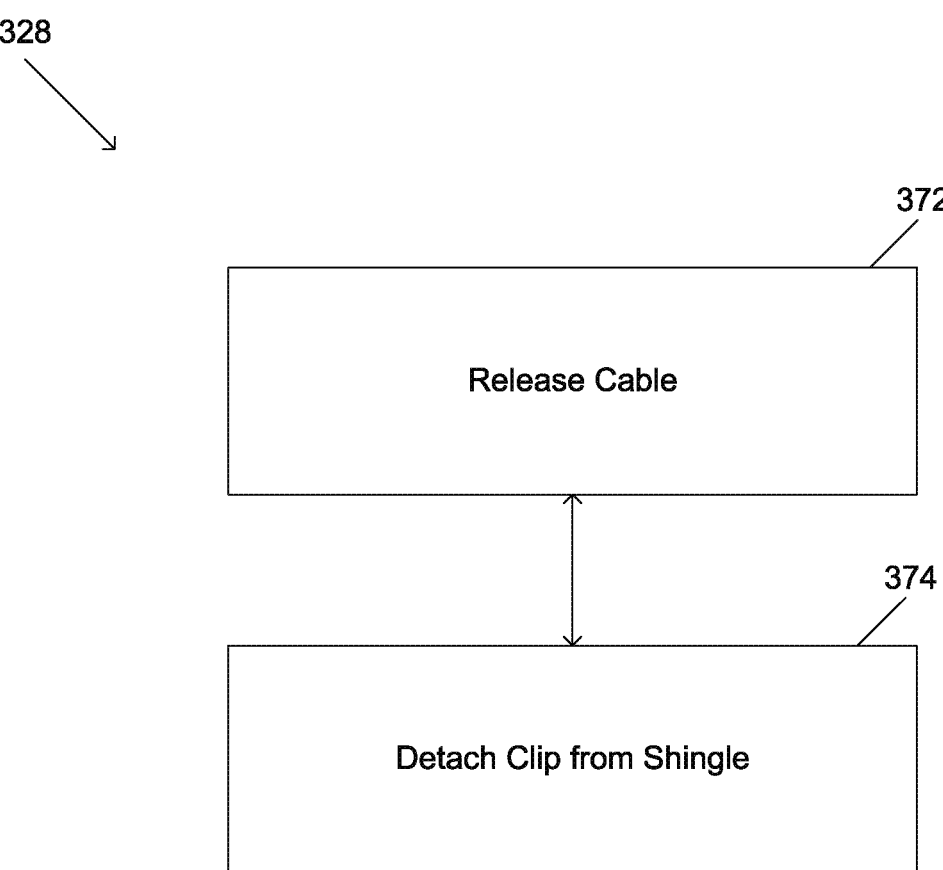
FIG. 25 is a flowchart of an example method of uninstalling the cable attachment system of FIG. 1.

FIG. 25 is a flowchart of an example method 328 of uninstalling the cable attachment system 100. The example method 328, includes operations 372 and 374.

In a first embodiment, the operation 372 is performed prior to the operation 374. In this embodiment, the cable 102, is first removed from all of the omni-directional clips 106 before the omni-directional clips 106 are removed from the building.

In another embodiment, the operation 374, is performed before the operation 372, so that the omni-directional clips 106, are removed from the building before the cable 102 is released from the omni-directional clips 106.

In a further embodiment, the operation 374, and operation 372, are repeated in series along the length of the cable 102. In this embodiment, the operation 374, and operation 372, are performed, in either order, with one or more omni-directional clips 106, at one location on the length of the cable 102. After completing both operations 334, 336, the method 324, is then repeated with the next one or more clips 106, 108, at a next location along the length of the cable 102.

In an additional embodiment, the method 328 only includes operation 372. In this embodiment, the clips 106 are left attached to the shingles on the roof, while the cable 102 is detached from the clips. In this embodiment, the cable 102, or another type of cable 102 can be reattached to the clips 106 later on, without ever requiring the removal or reinstallation of the clips 106.

The operation 372 consists of releasing the cable 102 from the omni-directional clip 106. In the operation 372, the cable 102 is released from the omni-directional clip 106 by either cutting the tie 302, untying the tie 302, or otherwise removing the tie 302. At this point, the cable 102 is free to move away from the omni-directional clip 106.

The operation 374 consists of detaching the clip from the shingle of the building. Operation 374 is further explained with reference to FIG. 26.

Figure 26:
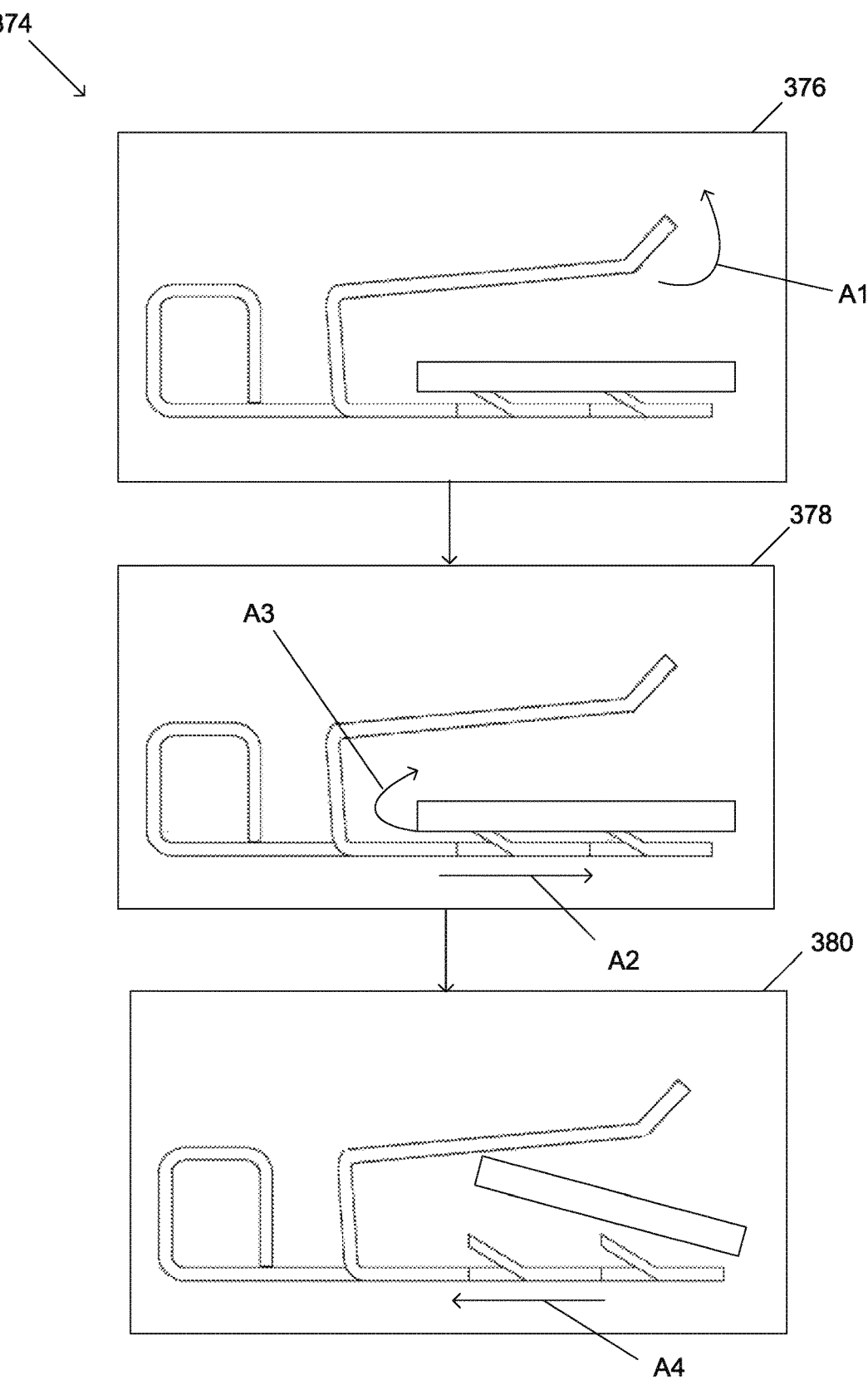
FIG. 26 illustrates an example method of detaching the omni-directional clip of FIG. 3 from a shingle.

FIG. 26 illustrates an example method 374 of detaching the omni-directional clip from a shingle, after the clip is attached to the shingle, as illustrated by FIG. 15. The example method of FIG. 26 includes operations 376, 378, and 380. In operation 376, the retaining portion is bent upwards in the direction of arrow A1, away from the shingle, to release the downward pressure applied to the top surface of the shingle by the retaining portion. In operation 378, the omni-directional clip is pushed slightly further towards the shingle, in the direction of arrow A2 to release the engagement of the teeth with the bottom surface of the shingle S. As the engagement of the teeth with the bottom surface of the shingle S is released, the shingle is lifted upwards, away from the teeth, in the direction of arrow A3. In operation 380, the omni-directional clip is removed from the shingle by pulling the omni-directional clip away from the free edge of the shingle in the direction of arrow A4. Because the teeth are no longer engaged with the bottom surface of the shingle, the omni-directional clip is free to move in the direction A4.

The omni-directional clip can be formed from a variety of materials. In some examples, the omni-directional clip is formed from a metal or plastic material. In some examples, the omni-directional clip is formed from a rugged anodized aluminum body.

Figure 27:
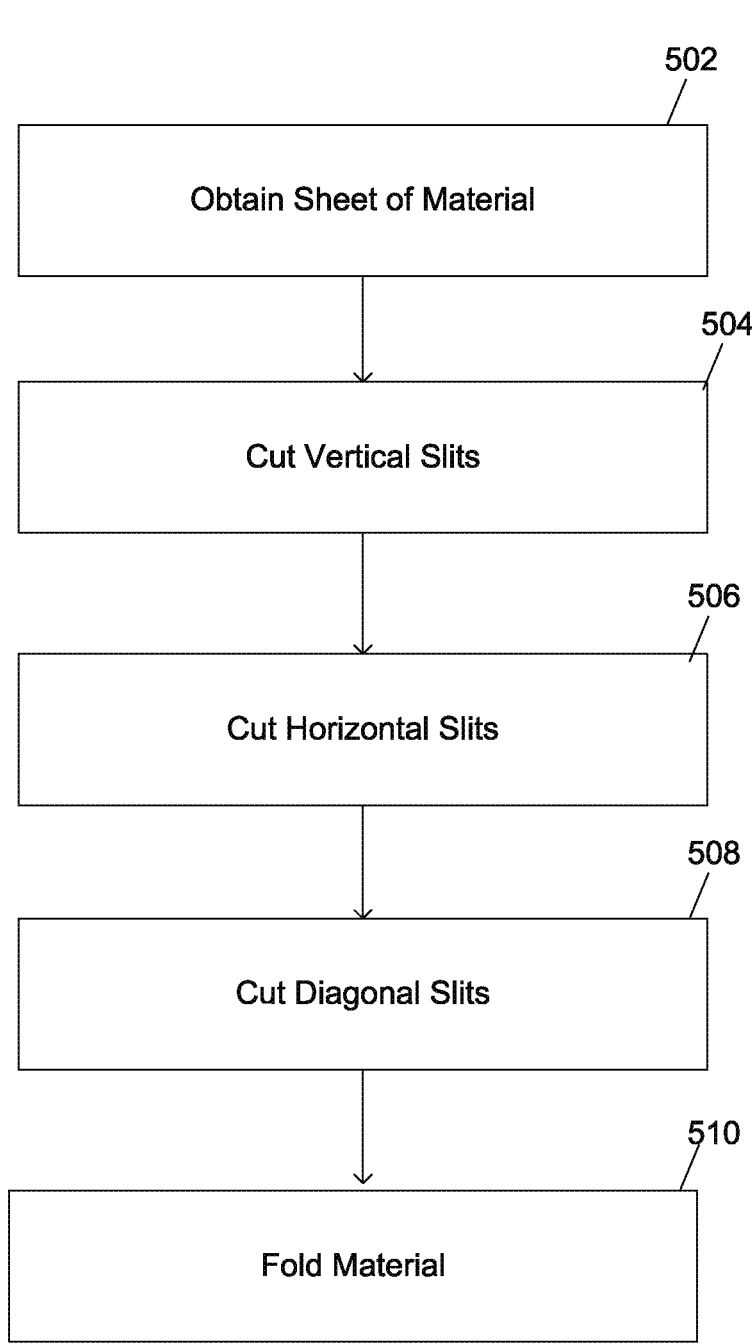
FIG. 27 is a flowchart of an example method of manufacturing the omni-directional clip.

FIG. 27 is an example flowchart of an example method 500 of manufacturing the omni-directional clip. The example method 500 includes operations 502, 504, 506, 508, and 510.

Figure 28:
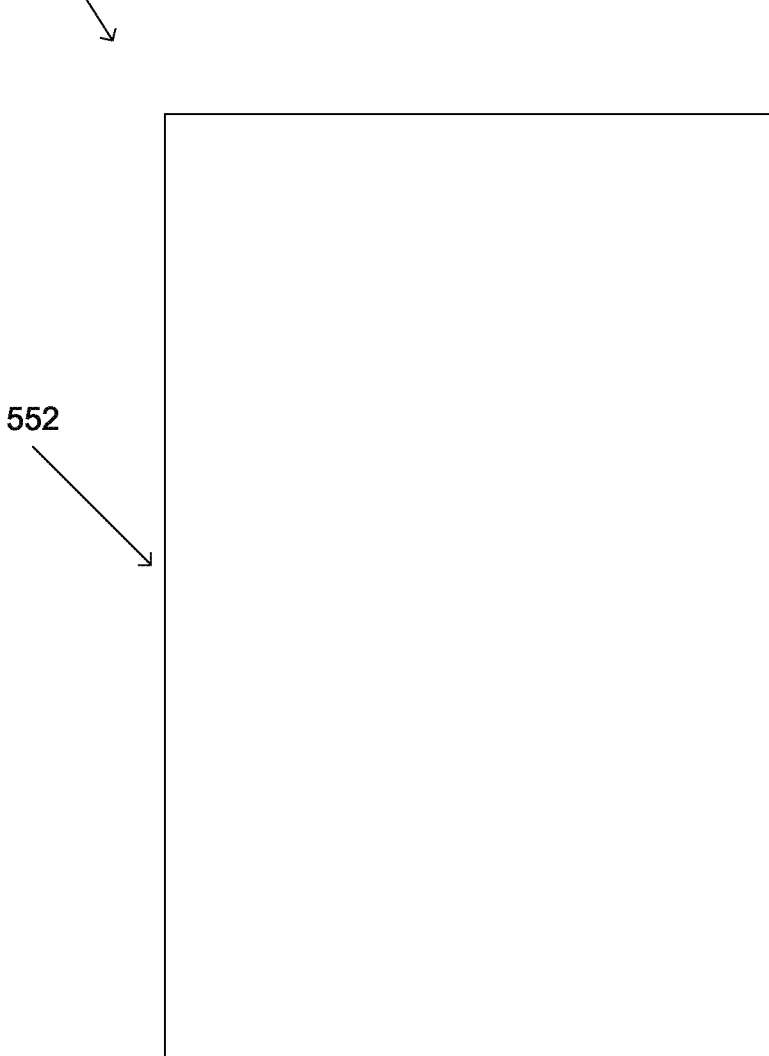
FIG. 28 is a top view of an example sheet of material after the first operation of the method of FIG. 27 is performed.

Operation 502, is illustrated by FIG. 28. In operation 502, a sheet of material 552 is obtained. By performing the method 500, the sheet of material 552 is converted into the omni-directional clip. As described above, various types of materials may be used. In some examples, the omni-directional clip is formed from a sheet of ruggedized aluminum material.

Figure 29:
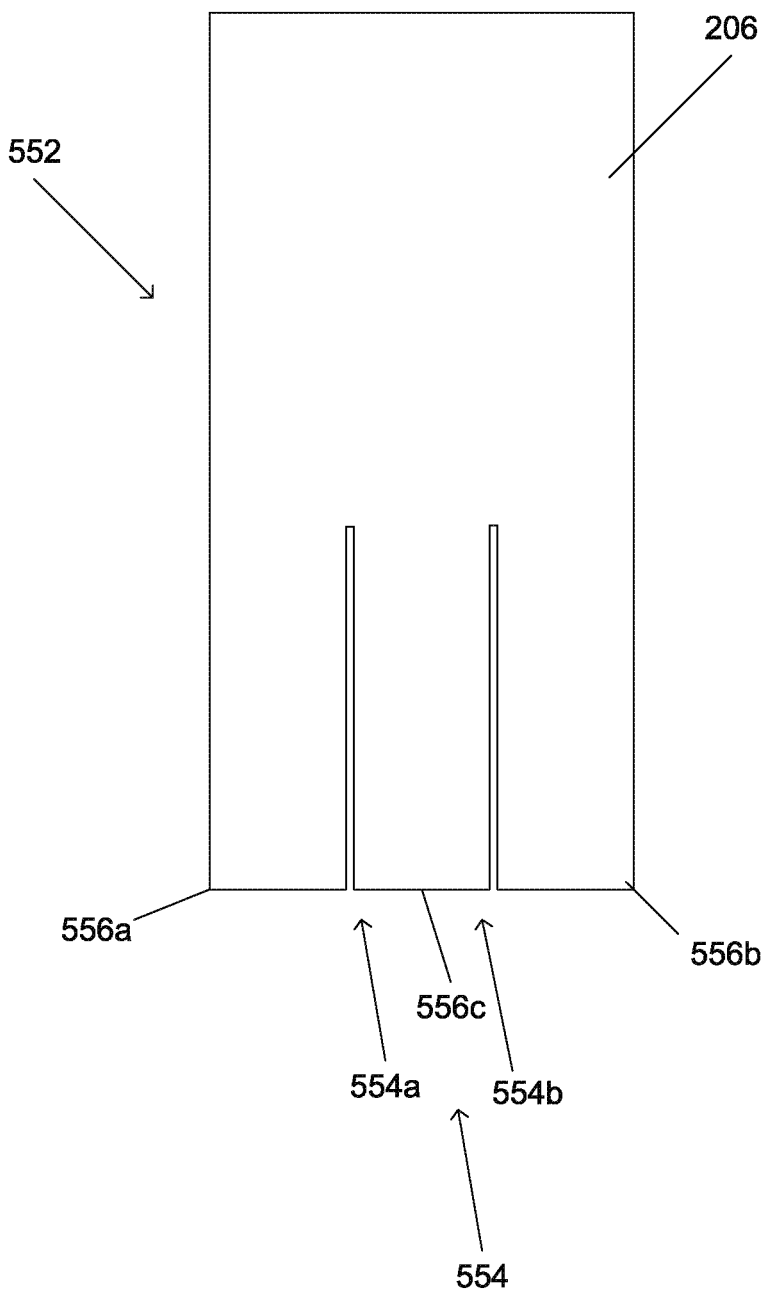
FIG. 29 is a top view of an example sheet of material after the second operation of the method of FIG. 27 is performed.

Operation 504 is illustrated by FIG. 29. In operation 504, two vertical slits 554a, 554b are cut into a front edge of the sheet of material 552. In some examples, the slits 554 extend approximately halfway down the length of the sheet of material 552. In some examples the slits 554 are spaced approximately equidistantly from each other and the left and right sides of the sheet of material 552. Cutting the slits 554 creates left strip 556b, a right strip 556a, and a center strip 556c. Each strip is attached at its rear end to the base 206.

Figure 30:
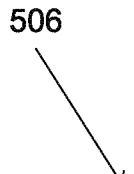
FIG. 30 is a top view of an example sheet of material after the third operation of the method of FIG. 27 is performed.
Figure 30:
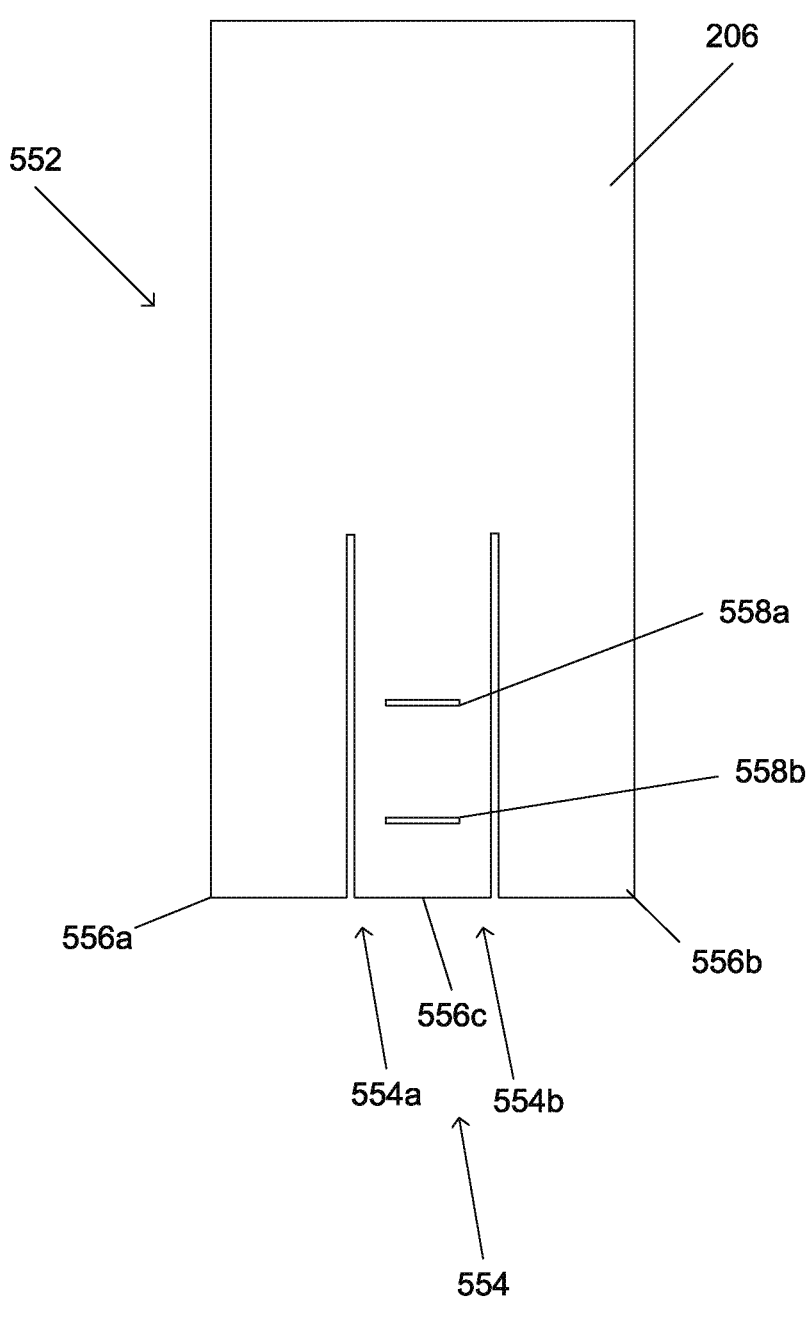

Operation 506 is illustrated by FIG. 30. In operation 506, two horizontal slits 558a, 558b are cut into the center strip 556c.

Figure 31:
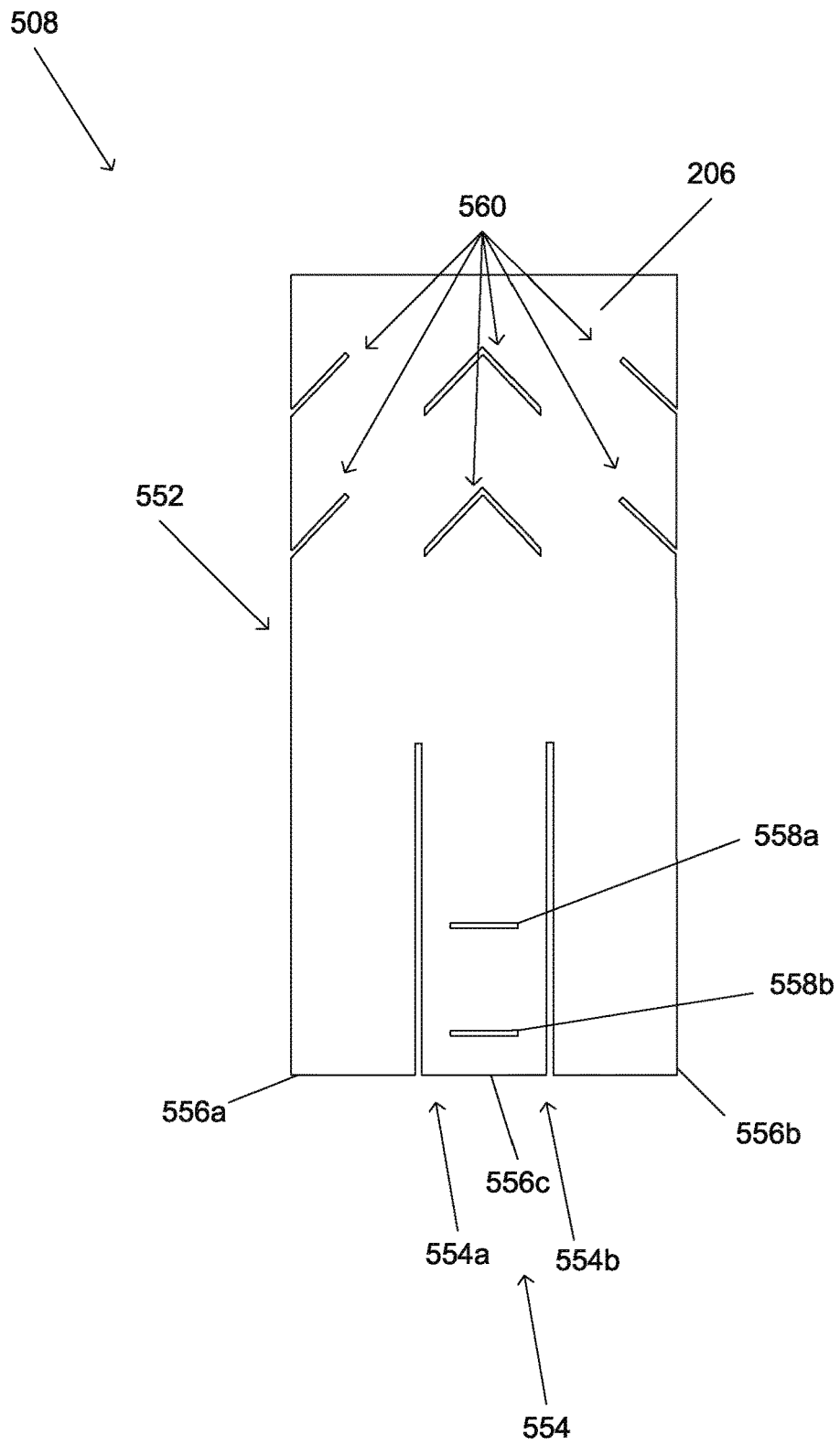
FIG. 31 is a top view of an example sheet of material after the fourth operation of the method of FIG. 27 is performed.

Operation 508 is illustrated by FIG. 31. In operation 508, diagonal slits 560 are cut into the base 206. In some examples, the diagonal slits 560 are cut rearwardly into the left and right sides of the base 206. In some examples, the diagonal slits 560 are cut in the interior of the base 206 so that they create a frontwardly oriented point. In some embodiments slits may be cut in other directions as well. For example, in the embodiment shown in FIG. 4, vertical slits are cut into base 206 in addition to the diagonal slits 560 to ultimately form teeth 232c and 232d.

Figure 32:
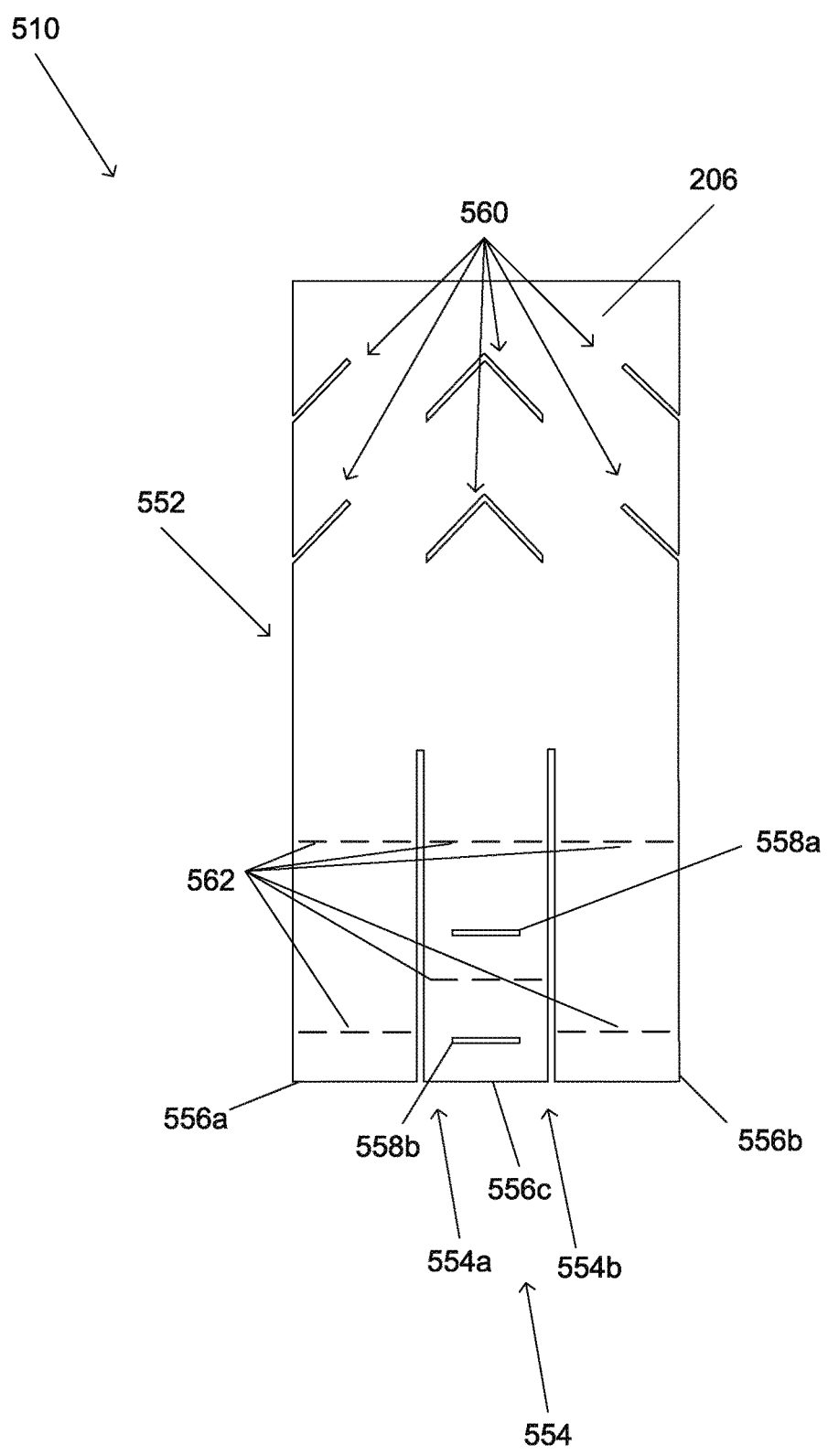
FIG. 32 is a top view of an example sheet of material after the fifth operation of the method of FIG. 27 is performed.

Operation 510 is illustrated by FIG. 32. In operation 510, the sheet of material 552 is bent. The center strip 556c is bent upwardly, rearwardly, and downwardly to create the cable attachment loop. The left and right strips 556a, 556b are bent upwardly and rearwardly to create the clip arms. The material formed by the diagonal slits 560 is bent upwardly to create the teeth (232, shown in FIG. 4). FIG. 32 depicts the cut sheet of material 552, along with the bend lines 562 where the material 552 is bent shown as dashed lines. Performance of operation 510 creates the finished product omni-directional clip depicted in FIGS. 3-10.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of securing a heating cable to a building, the method comprising:

attaching a roof clip to a shingle of the building, the roof clip including a cable attachment portion, the cable attachment portion including a closed cable attachment loop having a first upwardly extending portion with a first slit therein, a second upwardly extending portion with a second slit therein, and a cable platform extending between the first upwardly extending portion and the second upwardly extending portion;

after attaching the roof clip to the shingle, inserting a tie into the cable attachment portion; and after inserting the tie into the cable attachment portion, securing the tie around the heating cable to connect the heating cable to the roof clip.

2. The method of claim 1, wherein inserting the tie into the cable attachment portion comprises inserting the tie through the closed cable attachment loop of the cable attachment portion.

3. The method of claim 1, wherein inserting the tie into the cable attachment portion comprises inserting the tie through the first slit and the second slit in the closed cable attachment loop.

4. The method of claim 1, wherein the tie is a zip tie.

5. The method of claim 1, wherein the cable attachment portion and the tie together permit the heating cable to be secured to the roof clip at any orientation in a 360 degree range of orientations relative to the roof clip.

6. A cable attachment system comprising:

a cable, wherein the cable is a heating cable;

a clip comprising:

a base having a plurality of teeth protruding from a top side;

a retaining portion that extends over the top side of the base and the plurality of teeth;

a cable attachment portion including a closed cable attachment loop having a first upwardly extending portion with a first slit therein, a second upwardly extending portion with a second slit therein, and a cable platform extending between the first upwardly extending portion and the second upwardly extending portion, the cable platform being configured to secure the cable thereto with a tie; and a neck connected to and extending between the base and the cable attachment portion; and a shingle arranged between the base and the retaining portion.

7. The cable attachment system of claim 6, wherein the retaining portion includes a plurality of clip arms.

8. The cable attachment system of claim 6, wherein the base is substantially flat and substantially rectangular.

* * * * *